United States Patent
Jakobson et al.

(10) Patent No.: US 11,533,448 B2
(45) Date of Patent: Dec. 20, 2022

(54) PIXEL READOUT CIRCUIT AND A METHOD FOR IMAGING

(71) Applicant: SEMICONDUCTOR DEVICES LTD., Haifa (IL)

(72) Inventors: Claudio Gabriel Jakobson, Karmiel (IL); Nimrod Ben-Ari, Gilon (IL); Itzhak Nevo, Yaad (IL); Niv Shiloah, Lapidot (IL)

(73) Assignee: SEMICONDUCTOR DEVICES LTD., Haifa (IL)

( * ) Notice: Subject to any disclaimer, the term of this patent is extended or adjusted under 35 U.S.C. 154(b) by 0 days.

(21) Appl. No.: 17/284,883

(22) PCT Filed: Oct. 10, 2019

(86) PCT No.: PCT/IL2019/051116
§ 371 (c)(1),
(2) Date: Apr. 13, 2021

(87) PCT Pub. No.: WO2020/079683
PCT Pub. Date: Apr. 23, 2020

(65) Prior Publication Data
US 2021/0360184 A1    Nov. 18, 2021

(30) Foreign Application Priority Data

Oct. 14, 2018  (IL) .......................................... 262372

(51) Int. Cl.
*H04N 5/378*      (2011.01)
*H04N 5/353*      (2011.01)
*H04N 5/357*      (2011.01)

(52) U.S. Cl.
CPC ............. *H04N 5/378* (2013.01); *H04N 5/353* (2013.01); *H04N 5/357* (2013.01)

(58) Field of Classification Search
CPC ........ H04N 5/378; H04N 5/353; H04N 5/357; H04N 5/332; H04N 5/341; H04N 5/3745;
(Continued)

(56) References Cited

U.S. PATENT DOCUMENTS 5,107,122 A    4/1992  Barkan et al.
6,323,941 B1   11/2001 Evans et al.
(Continued)

OTHER PUBLICATIONS

Berner, et al., "Dynamic Vision Sensor for Low Power Applications", IEEE ISCE, 2014, pp. 1-2.
(Continued)

*Primary Examiner* — Nhan T Tran
*Assistant Examiner* — Chan T Nguyen
(74) *Attorney, Agent, or Firm* — Dorsey & Whitney LLP

(57) ABSTRACT

A pixel readout circuit and a technique for imaging are disclosed. The circuit includes: an array of pixel integration circuits, each adapted for receiving an electric signal indicative of photocurrent of light sensitive pixel of a pixel matrix, integrate the electric signal over a frame period, and output the integrated signal at an imaging frame rate being one over the period; and an array of pixel derivation circuits, each includes a signal preprocessing channel for receiving a total electric signal indicative of at least a component of the photocurrent(s) of a cluster of respective light sensitive pixel(s); and a comparison unit adapted to analyze the total electric signal to determine digital data indicative of a
(Continued)

change in the total electric signal relative to one or more thresholds; and a digital output utility adapted to readout of the digital data at a second rate different than the frame rate.

18 Claims, 12 Drawing Sheets

(58) Field of Classification Search
CPC ... H04N 5/343; H04N 5/33; G01J 1/46; G01J 1/44; G01J 2005/202; G01J 5/20; G01J 2001/446; G01J 2001/448; H03M 1/50
USPC .......................................................... 348/297
See application file for complete search history.

(56) References Cited

U.S. PATENT DOCUMENTS

| | | | |
|---|---|---|---|
| 6,678,039 B2 | 1/2004 | Charbon | |
| 9,215,386 B2 | 12/2015 | Elkind et al. | |
| 2008/0001065 A1 | 1/2008 | Ackland | |
| 2008/0106622 A1 | 5/2008 | Turchetta et al. | |
| 2012/0248288 A1 | 10/2012 | Linder et al. | |
| 2012/0261553 A1* | 10/2012 | Elkind | H04N 5/3745 250/208.1 |
| 2016/0057366 A1 | 2/2016 | Lee et al. | |
| 2016/0094796 A1* | 3/2016 | Govil | H04N 5/37452 348/295 |
| 2018/0041727 A1* | 2/2018 | Lund | H04N 5/2353 |

OTHER PUBLICATIONS

Kavusi, et al., "Architectures for High Dynamic Range, High Speed Image Sensor Readout Circuits", VLSI-SoC: Research Trends in VLSI and Systems on Chip. IFIP International Federation for Information Processing, 249, 2008, pp. 1-23.

Lichtsteiner, et al., "A 128 128 120 dB 15 µs Latency Asynchronous Temporal Contrast Vision Sensor", IEEE Journal of Solid-State Circuits, vol. 43, No. 2, Feb. 2008, pp. 566-576.

International Search Report from International Application No. PCT/IL2019/051116 dated Jan. 27, 2020.

Schultz, et al., "Digital-Pixel Focal Plane Array Technology", Lincoln Laboratory Journal, vol. 20, No. 2, 2014, pp. 36-52.

Son, et al., "A 640×480 Dynamic Vision Sensor with a 9 µm Pixel and 300Meps Address-Event Representation", IEEE International Solid-State Circuits Conference, session 4: 66-67, Feb. 6, 2017, pp. 66-68.

* cited by examiner

PIXEL READOUT CIRCUIT AND A METHOD FOR IMAGING

TECHNOLOGICAL FIELD

The present invention is in the field of video imaging and particularly relates to readout circuits for image sensors and to techniques for capturing/producing high frame rate video.

BACKGROUND

Conventional video imaging techniques are based generally on integration of photocurrents of the photodetectors of an image sensor (pixel matrix) over an integration frame period, which is typically performed by a readout circuit of the image sensor), and output of the integrated values at a frame rate being one over the frame period.

Typically, the output is performed via an analog output circuitry (analog column and raw wires and respective pixel select switches capable of outputting the integrated analog signals from the respective individual pixels' readout circuits.

Alternatively, currently developed digital readout circuits, as for example described in the article "Digital-Pixel Focal Plane Array Technology" by Schultz et al, Lincoln Laboratory Journal, volume 20, number 2, 2014 (herein after Shultz), propose utilizing in-pixel signal digitization (within the individual pixel readout circuit) and digitally outputting from each pixel, digital data with relatively high bit depth (e.g., 16 bit digital data) from which an image/video can be constructed.

GENERAL DESCRIPTION

Grabbing video frames at high frame rates is desired for various video imaging applications. For instance many applications, such as: autonomous navigation on a spatial imaging field, collision awareness, wake-up on demand, may benefit from video imaging with fast imaging frame rates, that enables observation of fast moving/changing objects, such as objects moving in a variable illumination environment, and the structure/intensity profile of fast events inside the image, e.g., fluorescent events.

However, the conventional video imaging readout circuits present a bottleneck to the achievable video frame rates, or allow obtaining high frame rates at the expense of very law spatial pixel density. Indeed, in the conventional analog readout circuit the achievable frame rate is generally limited up to hundreds of Hertz due to practical limitations of the analog circuits. As for digital in-pixel processing such as that suggested in the article indicated above by Schultz, such techniques require incorporating complex digital processing modules within each pixel and/or require using a large plurality of about 10 output bit lines for reading out image data from each pixel. This in-turn severely limits that achievable pixel density in the pixel matrix (since the required area of the individual digital pixel readout circuits is relatively large (much larger as compared to equivalent analog pixel readout circuits by which video of equivalent bit depth. can be constructed.

Some pixel readout circuits offer a combination of analog in-pixel circuitry (integration circuits) for outputting image data from the pixels, and digital in-pixel circuitry for detection of fast events associated with rapid change in the light intensity sensed by the pixels. For instance, U.S. Pat. No. 9,215,386, assigned to the assignee of the present application, discloses a pixel readout circuit for use with an imaging pixel array. The pixel readout circuit includes: an input channel for receiving an image signal corresponding to electrical output of a photosensitive element of the pixel; and an electronic circuit interconnected between said input channel and an output readout utility. The electronic circuit comprises a capacitive unit, and a single analyzer. The capacitive unit is controllably linked to input channel for accumulating charge corresponding to received intensity generated by said pixel during a single frame period, and is connected to output readout utility. The signal analyzer unit is controllably linked to input channel and connected to output readout utility, and is configured for analyzing at least a part of said image signal by determining change in amount of accumulated charge corresponding to the received intensity, and upon detecting that the amount of charge satisfies a predetermined condition generating data indicative of a detected event.

However, the frame rate of the video produced by such pixel readout circuit remains limited to the frame rate of the analog integration circuit. This is because the event data that can be detected at higher rates that the imaging frame rate, is binary event data indicative only of whether an event occurred or not, and cannot be used for construction of video data with frame rates higher than the frame rate of the analog integration circuit.

The present invention provides novel systems and method of solving the above indicated deficiencies of the existing conventional techniques, and enabling video capturing/reconstruction at high frame rates (e.g., in the order of 10 KHz), and with relatively large pixels density (e.g., with pixel's area in the order of 100 $\mu m^2$ and below). This is achieved according to the technique of the present invention by provided a readout circuit including at least a pixel integration circuit per each pixel of a pixel matrix, which is operable at frame rates in the order of hundreds of Hertz to output the integral of the photocurrent sensed by the respective pixel, and a pixel derivation circuit per each cluster of one or more pixels of the pixel matrix (e.g., four pixels), which operates at much higher rates (e.g., in the order of 10 KHz) to output digital data indicative of the direction of the derivative of the photocurrents sensed by its respective cluster of pixels (e.g., output of two bit data indicative of whether the derivative is positive negative or constant). Since only two bits of data need to be outputted at the high frame rate (e.g., via not more than two bit lines per pixel, or in some more compact embodiments of the present invention even via a single bit line cluster), the digital derivation circuitry configured for this purpose, and its associated bit lines, is very compact facilitating use of such readout circuit with pixel matrix of the high pixel density.

To this end, according to the present invention the integrated pixel's signals provided at the relatively lower frame rates (about hundreds of Hertz) and the derivated signals of the pixel's clusters provided at the higher frame rates, in the order of 10 KHz, may be further processed to reconstruct video footage with frame rates matching the high frame rates in the order of 10 KHz.

In this regards, according to one broad aspect of the present invention there is provided a readout circuit for use with a pixel matrix, which includes an array of light sensitive pixels. The readout circuit includes:

(a) An array of pixel integration circuits, each pixel integration circuit is adapted for receiving an electric signal indicative of photocurrent of respective light sensitive pixel of the pixel matrix and is configured and operable for integrating said electric signal over a frame period to produce an integrated analogue signal;

said array of pixel integration circuits is associated with an imaging output readout utility enabling readout of said integrated analogue signal, indicative of the light intensity sensed by said light sensitive pixel during said frame period, at an imaging frame rate being one over said frame period; and (b) An array of pixel derivation circuits; each pixel derivation circuit comprises signal preprocessing channel configured and operable for receiving a total electric signal indicative of at least a component of the photocurrent(s) of a cluster of one or more respective light sensitive pixels of the pixel matrix; a comparison unit adapted to analyze said total signal to determine digital data indicative of whether a change in said total electric signal is above a predetermined upper threshold, below a predetermined lower threshold, or in between said predetermined upper and lower thresholds; said array of pixel derivation circuits is associated with a digital output utility adapted to enable readout of said digitized data at a second rate different than said frame rate.

In some implementations the readout circuit includes second rate is higher than said frame rate.

In some implementations the readout circuit includes an array of front end input circuits associated with the light sensitive pixels of the pixel matrix. In this regards may be configured in at least one of the following configurations:

(i) The pixel integration circuits are electrically connected to the front end input circuits of the light sensitive pixels associated therewith respectively, for obtaining therefrom respective electric signals indicative of photocurrents of the respective light sensitive pixels; and (ii) The pixel derivation circuits are electrically connected to the front end input circuits of the respective clusters of light sensitive pixels associated therewith respectively, for obtaining therefrom respective total electric signals indicative of the photocurrents of the one or more light sensitive pixels of the respective cluster.

In some embodiments the front end input circuits are configured and operable in at least one of the following modes: Buffered Direct Injection (BDI); direct injection (DI); capacitive trans-impedance amplification (CTIA); and source follower structure (SF).

In some implementations each pixel integration circuit includes a capacitive unit comprising at least one capacitor, connectable to said input channel for accumulating a charge corresponding to received intensity generated by the respective light sensitive pixel of the pixel matrix during said frame period. To this end, in some embodiments the pixel integration circuits include an imaging output circuit associated with said imaging readout utility and connectable to the capacitive unit and adapted for enabling readout of a signal indicative of the accumulated charge. For instance the imaging output circuit may be an analogue imaging output circuit comprising a buffer connectable to said capacitive unit and controllably linked to column signal wire and row signal wire adapted for reading out signal indicative of said accumulated charge.

According to some embodiments the preprocessing channel of the pixel derivation circuit includes a filtration circuit adapted for filtering a DC component of the total electric signal such that the total electric signal represents an AC component indicative of a variation in the photocurrents of the one or more light sensitive pixels of the cluster associated with the pixel derivation circuit.

In this regard it should be noted that the phrase DC component(s) of a signal is used herein to designate low frequency components of the signal, which are in the order of, or lower, than the frame rate. Particularly in embodiment where the second rate is higher than the frame rate, the phrase DC component(s) is used to encompass low frequency components of the signal, which are substantially lower than the second rate, e.g., an order of magnitude or more lower than the second rate. Accordingly, the phrase AC component(s) designates frequency components of the signal which are higher than the frequencies of the DC component(s).

For instance the filtration circuit may be a high pass filter. In this case the digital output utility may be adapted to enable readout of said digitized data at a second rate being one or more orders of magnitude higher than said frame rate; and the high pass filter is configured and operable for filtering out DC components of the total electric signal whose frequencies are lower than said second rate.

Alternatively or additionally, the filtration circuit may include: a high path filter for filtering out low frequency components of the total electric signal; and integration and a derivation circuits connected sequentially for receiving the filtered signal from the high path filter and operable for carrying out consecutive integration and derivation of the filtered signal. In such configuration the filtration circuit removes low frequency components from the filtered signal while also averaging out high frequency noise. Thus in case the digital output utility may be adapted to enable readout of said digitized data at a second rate being one or more orders of magnitude higher than said frame rate, the filtration circuit is configured and operable for filtering out DC components of the total electric signal having frequencies are lower than said second rate, and the consecutive integration and derivation are performed at a rate matching said second rate or higher. Accordingly, the high pass filter may be configured and operable for filtering out DC components of the total electric signal whose frequencies are an order of magnitude or more lower than the second rate, while further filtration of frequencies lower than said second rate is obtained via said consecutive integration and derivation of the filtered signal.

According to some embodiments, the digital output utility is adapted to enable readout of the digitized data at a second rate being one or more orders of magnitude higher than said frame rate.

According to some embodiments of the present invention the comparison unit includes one or more comparison channels, each associated with digital output circuit of said digital readout utility and comprising a single output bit line. The one or more comparison channels are adapted for comparing said total electric signal with said predetermined upper and lower thresholds and thereby determining said digitized data.

For example each comparison channel comprises: a comparator whose inputs are connectable to said preprocessing channel and to a reference voltage channel providing at least one of said upper and lower thresholds; a latch (e.g., a bit memory unit) connectable to an output of the comparator of storing at least one bit of said digitized data resulting from said comparing. an output bit line connectable to the latch for outputting the at least one bit; and a reset channel for resetting said latch.

In some embodiments the comparison unit includes a single comparison channel associated with a single latch and a single output bit line connectable to said single latch; and wherein the single comparison channel is further configured and operable to serialize the digital data for output through the single bit line (the term serialize should be understood herein as sequentially communications of more than one bits through a bit line (one bit at a time). In this regards, the digital data (being indicative of whether a change in said total electric signal is above a predetermined upper threshold, below a predetermined lower threshold, or in between the predetermined upper and lower thresholds) is more than one bit per period of one over the second rate. Accordingly the single comparison channel is capable of performing said serializing at a rate higher than said second rate (e.g., twice the second rate) to thereby enable repeatedly readout of said digitized data completely at a second rate.

In some embodiments the single comparison channel includes a signal modulator adapted to modulate the signals of at least one of the reference voltage channel and the preprocessing channel, which are fed to the inputs of the comparator (e.g., with modulation frequency matching said second rate). Accordingly the comparator of the single comparison channel operates at twice the second rate, and wherein frequency and shape parameters of said modulation are such that said comparator effectively successively compares the total signal with the upper and lower thresholds. In this way the results of the successive comparisons being indicative of the complete digital data per time slot, are successively stored by the single latch of the single comparison channel. This thereby enables serializing said digitalized data for read out via the single bit line of said single comparison channel (e.g., the readout of the digital data should be performed at at least 1.5 the second rate, or at least twice the second rate, in order to obtain the complete digitized (digital) data]. For example the signal modulator may be adapted to provide a squared signal with repetition period matching the second rate.

Thus in some embodiments the signal modulator is connectable to the reference voltage channel for modulating the signal therein to swing between said upper and lower thresholds at said second rate.

Alternatively or additionally, the single comparison channel may include a signal chopper connectable to said preprocessing channel for chopping the total electric signal at twice the second rate, and the signal modulator is connectable to the signal chopper for alternately inverting the total signal being chopped before it is fed to the comparator.

Yet alternatively or additionally, the single comparison channel may include: two comparators operable at the second rate, wherein a first input of each of the two comparators is connectable to said preprocessing channel and the second inputs of the two comparators are connectable to respective reference voltage channels providing voltages of said upper and lower thresholds respectively. The single comparison channel further includes combinatory logic circuitry inter-connected between outputs of said two comparators and the single latch and operable for successively storing the outputs of said two comparators by said single latch thereby enabling to serialize said digitalized data for read out via the single bit line.

Thus in some implementations, per each pixel derivation circuit of the pixel derivation circuits, the digital output utility includes only a single digital output circuit having single output bit line for readout of the digitized data of the pixel derivation circuit.

Alternatively, some implementations include two comparison channels associated with two bit-lines and wherein a reference voltage of a comparator of a first one of said comparison channels provides said upper threshold, and a reference voltage of a comparator of a second one of said comparison channels provides the lower threshold. This thereby enables readout said digital data via said two bit lines at said second rate.

According to some embodiments, at least one pixel derivation circuit of the pixel derivation circuits is configured and operable for electrically connecting, directly or indirectly (e.g., indirectly—namely via respective front end circuit), to a single respective light sensitive pixel of the pixel matrix. The total electric signal is in such cases indicative of at least a component of the photocurrent of the single respective light sensitive pixel.

According to some embodiments, at least one pixel derivation circuit of the pixel derivation circuits is configured and operable for electrically connecting, directly or indirectly (e.g., via respective front end circuit), to a plurality of light sensitive pixels of the cluster associated with therewith. The signal preprocessing channel of the at least one pixel derivation circuit is thus configured and operable for combining at least components of the electric signals, which are indicative of the photocurrents of said plurality of light sensitive pixels, of the cluster to thereby from the total electric signal.

In some implementations, the readout circuit is configured and operable for connecting to the pixel matrix, whereby the pixel matrix is a focal plane array (FPA) operable for sensing light in one or more spectral bands of the IR regime.

To this end, according to another broad aspect of the present invention there is provided an integrated image sensor, includes a readout circuit according to any one of the above described embodiments electrically coupled to a light sensitive pixel matrix operable for imaging light in one or more spectral bands. The spectral bands may be for example spectral bands in the IR regime, or in some implementations spectral bands in the visible regime, UV regime or combination thereof (all depending for example on the pixel matrix technology)

In some implementations the integrated image sensor of claim 25, wherein the readout circuit and the light sensitive pixel matrix are integrated. For instance the integrated image sensor may be configured as a hybrid integrated heterostructure and wherein said readout circuit and said pixel matrix are made of different semiconductor technologies (e.g., materials/compositions). More specifically for example, the readout circuit may include, or be formed with, silicon based semiconductor materials, and said pixel matrix may include, or be formed with, any one or more of the following semiconductor technologies: InGaAs, Type II supper lattice, xBN, InSb, HgCdTe, Ge, SiC.

According to yet another aspect of the present invention there is provided an imaging processing system adapted for connecting to the imaging output readout utility and to the digital output utility of the readout circuit according to any one of the above embodiments. The imaging processing system may be configured and operable for carrying out the following to obtain video information at a video frame rate higher than said imaging frame rate:

Obtain, from said imaging output readout utility of the readout circuit, imaging data comprising the integrated analogue signals indicative of the light intensity sensed by each light sensitive pixel of said pixel matrix during each frame period, thereby yielding a video data comprising image frames at said imaging frame rate;

Obtain said digitized data from the digital output readout utility at said second rate;

Process the digitized data at said second rate to determine whether the change in the total electric signal of at least one cluster of one or more respective light sensitive pixels of the pixel matrix, is above the predetermined upper threshold or below the predetermined lower threshold;

wherein such change indicates that the intensity sensed by one or more light sensitive pixels of the cluster is rapidly changing, upwards or downwards respectively, with rate higher than said imaging frame rate; and Upon determining such change updating the values of corresponding pixels in the video data thereby obtaining an updated video data with video frame rate matching said second rate.

According to further yet another aspect, the present invention also provides a method for processing electric signals obtained from light sensitive pixels of a pixel matrix. The method includes:

Integrating electric signals indicative of the light intensity sensed by each light sensitive pixel of a pixel matrix during each frame period of a first imaging frame rate, thereby yielding integrated image data indicative of a video comprising image frames at said imaging frame rate;

Filtering total electric signals, each indicative of the sum of light intensity sensed by a cluster of one or more light sensitive pixel of the pixel matrix, to obtain filtered electric signals indicative of changes in (e.g., variations/derivatives of) light intensity sensed by respective clusters of one or more light sensitive pixel of the pixel matrix in each cluster; and Comparing the filtered electric signals with a plurality of at least two thresholds at a second rate, to determine, at said second rate, digitized data indicative of whether the changes in the light intensities sensed by respective clusters of pixels correspond to positive, negative or zero derivative values of the light intensities sensed by respective clusters.

In some embodiments the method includes analog output of an analogue representation of the integrated image data, at the imaging frame rate. Alternatively or additionally, in some implementations the method includes digital output of the digitized data via a single bit line per each cluster of said respective clusters. The single bit line is in this case operated at a rate of at least 1.5 the second rate (or twice the second rate) to thereby enable to completely output said digitized data at said second rate.

According to yet additional aspect of the present invention there is provided an image processing method, including:

Obtaining an integrated image data indicative of a video at an imaging frame rate, being a first frame rate; said obtained from a pixel matrix; at a first frame rate; said integrated image data comprises image frames at said imaging frame rate wherein each image frame comprises pixelated data indicative of an integral light intensity sensed by each light sensitive pixel of a pixel matrix during a respective first frame period being one over said first frame rate;

Obtaining digitized data indicative of plurality of derivative frames at a second rate that is one or more orders of magnitude higher than said first rate; each derivative frame comprising data indicative of time derivatives of light intensities sensed by a plurality of respective clusters of one or more of said light sensitive pixels during short period time slots whose durations are one over said second rate; and Processing said integrated image data and said digitized data to obtain, video data with final video frame rate one or more orders of magnitude higher than said first frame rate.

In some embodiments the image processing method includes duplicating at least one image frame of said integrated image data of the video to obtain several duplicates of the at least one image frame, arranged in a time sequence within said respective first frame period and with time difference between them shorter than said respective first frame period; and utilizing the digitized data corresponding to time slots within the respective first frame period of said at least one image frame time, to update values of image pixels of at least one duplicate of the at least one image frame which is associated with a certain time instant, in accordance with integral values of the time derivatives of the light intensities sensed by the respective clusters of pixels, whereby said time derivatives are indicated by the derivative frames obtained for the time slots that extend within the respective first frame period up to said certain time instant.

According to yet another broad aspect of the present invention there is provided a readout circuit for use with a pixel matrix, comprising an array of light sensitive pixels, whereby the readout circuit includes:

(a) an array of pixel integration circuits, each pixel integration circuit is adapted for receiving an electric signal indicative of photocurrent of respective light sensitive pixel of the pixel matrix and is configured and operable for integrating the electric signal over a frame period to produce an integrated analogue signal; the array of pixel integration circuits is associated with an imaging output readout utility enabling readout of said integrated analogue signal, indicative of the light intensity sensed by the light sensitive pixel during said frame period, at an imaging frame rate being one over said frame period; and (b) an array of pixel derivation circuits, whereby each pixel derivation circuit includes:

i) a signal preprocessing channel comprising a filtration circuit configured and operable for receiving a total electric signal indicative of at least a component of the photocurrent(s) of a cluster of one or more respective light sensitive pixels of the pixel matrix, and filtering out a DC component of the total electric signal to obtain a filtered total electric signal representing an AC component indicative of a variation in the photocurrents of the one or more light sensitive pixels of the cluster associated with the pixel derivation circuit; and ii) a comparison unit adapted to analyze said filtered total electric signal to determine digital data indicative of whether a change in said filtered total electric signal exceeds a predetermined threshold;

The array of pixel derivation circuits is associated with a digital output utility adapted to enable readout of said digitized data at a second rate, different than the frame rate. The filtration circuit of the pixel derivation circuit includes: a high path filter for filtering out low frequency components (referred to herein as DC) of the total electric signal; and integration and a derivation circuit connected sequentially for receiving the filtered signal from the high path filter and operable for carrying out consecutive integration and derivation of the filtered signal. This thereby removes low frequency components while also averages out high frequency noise.

In some implementations the digital output utility is adapted to enable readout of the digitized data at a second rate being one or more orders of magnitude higher than the frame rate; and the filtration circuit is configured and operable for filtering out DC components of the total electric signal having frequencies are lower than said second rate. In some implementations the consecutive integration and derivation are performed at a rate matching the second rate or higher. The high pass filter may be configured and operable for filtering out DC components of the total electric signal having frequencies are an order of magnitude or more lower than said second rate. Further filtration of frequencies lower than the second rate is obtained via the consecutive integration and derivation of the filtered signal.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 1B to 1D are block diagrams of sub circuits of the readout circuit 1000 according to an embodiment of the present invention, in which: FIG. 1B exemplifies a front end circuit, being part of the optional array 100 of front end circuits; FIG. 1C exemplifies an pixel integration circuit being part of the array 200 of pixel integration circuits; and FIG. 1D exemplifies an pixel derivation circuit being part of the array 300 of pixel derivation circuits.

FIGS. 3A to 3E are block diagram illustrating in self-explanatory manner the configuration and operation of pixel readout circuits (PROICs) of the readout circuit 1000 according to various embodiments of the present invention, in which: FIG. 3A illustrates in more details the imaging and digital readout utilities associated with the PROICs; FIG. 3B illustrates in more details the configuration of the comparison unit of pixel derivation circuit outputting the derivative data via two bit lines; and FIG. 3C to 3E illustrate in more details three example configurations of comparison units and memory units, 320 and 330, of pixel derivation circuit adapted for outputting the derivative data via only a single bit line;

DETAILED DESCRIPTION OF EMBODIMENTS

Figure 1A:
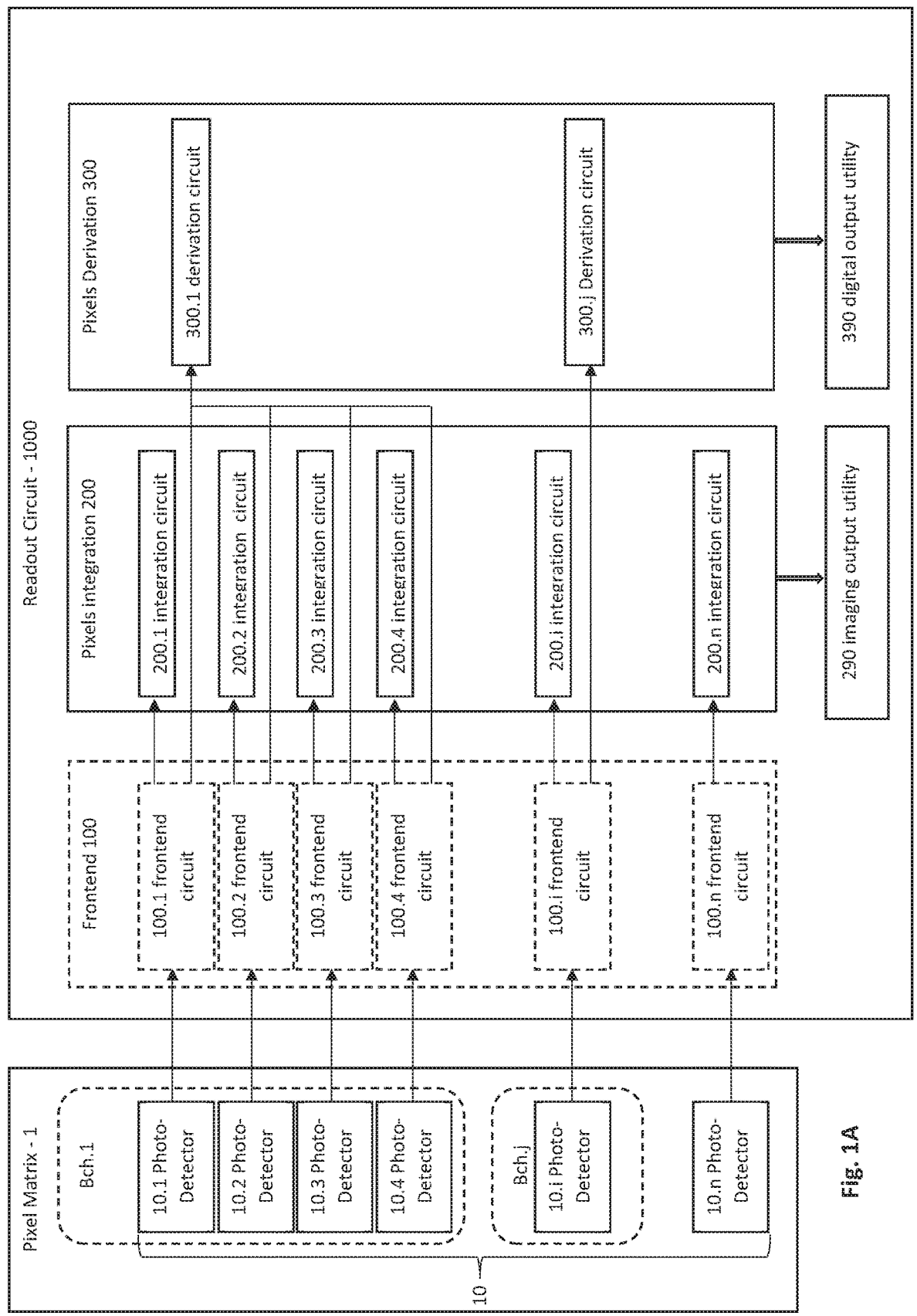
FIG. 1A is a block diagram of a readout circuit 1000 according to an embodiment of the present invention.

Reference is now made to FIG. 1A showing a block diagram of a readout circuit 1000 according to an embodiment of the present invention. The readout circuit 1000 is adapted for use with a pixel matrix 1 including an array 10 of light sensitive pixels 10.1 to 10.n. The readout circuit includes an array of pixel integration circuits 200 adapted for timely integrating the individual signals (e.g., being the photocurrent signal or a signal indicative thereof) of the light sensitive pixels of the pixel matrix 1, and an array of pixel derivation circuits 300 adapted for time derivation the electric signals of the light sensitive pixels of the pixel matrix 1, whereby in some embodiments the derivation may be performed separately on the individual electric signals of the light sensitive pixels, or more generally, the derivation may be performed separately on the sums of electric signals of clusters of one or more light sensitive pixel (e.g., each cluster may include one or a plurality of light sensitive pixel (e.g., adjacent or not), thereby reducing the number of pixel derivation circuits in the readout circuit 1000.

To this end, the readout circuit 1000 of the present invention is configured and operable for providing two types of output for at least some of the light sensitive pixels/batches thereof of the pixel matrix 1:

(i) Typically per each light sensitive pixel (photodetector) the readout circuit 1000 outputs an integrated signal indicative of the integrated photocurrent over an imaging time frame period (e.g., indicative of accumulated charge induced by photocurrent over the time frame period). This is generally performed by the integration circuits 200 per each operative pixel in the pixel matrix (i.e., per each light sensitive pixels, except where the case may be, for dead pixels), with imaging frame rate (i.e., with imaging frame rate that is being one over the above indicated frame period) which is in the order of 100s of HZ (e.g., currently achievable up to about 1 KHz). I.e., the imaging frame rate is one over the above indicated frame period. To this end, the integration circuits 200 are associated with imaging output readout utility 290 enabling readout of said integrated signal (e.g., indicative of a value of integrated light intensity sensed by said light sensitive pixel during said frame period) at an imaging frame rate being one over the frame period during which the photocurrent/photodetector's signal is integrated.

(ii) Per each of one or more batches (e.g., Bch.1 and Bch.j) of light sensitive pixels (e.g., each batch may include one or a plurality of pixels, as in batches Bch.j and Bch.1 respectively), the readout circuit 1000 digitally outputs, a derivative signal (i.e., derivative data), indicative of the derivative of the total/sum-of photocurrent(s) of the light sensitive pixels of the batch. This is generally performed by the derivation circuits 300, one per each batch of pixels to which an operative derivation circuit (e.g., 300.1 and 300.j) is connected. The derivation circuits 200 are generally configured to operate for determine the derivative data of their respective pixel batches at a second rate that is much higher than the above mentioned imaging frame rate. For instance the second rate may be for example in the order of KHz or above, for example up to 10 KHz or even up to 100 KHz or higher. The derivation circuits are associated with a digital output utility 290 adapted to enable readout of the digitized data—namely the digitized derivative/change in the of photocurrent of each batch of one or more pixels, at the above indicated second rate, which is, as said, higher than the imaging frame rate.

In this regards, it should be noted that the present invention provides a novel technique for obtaining high rate high resolution imaging capabilities, which exceed the capabilities of conventional imaging techniques.

Indeed conventional imaging techniques, which are based on analogue integrations of the pixel's photocurrent are generally inherently limited by the achievable frame rates, e.g., to up to hundreds of Hz. This is practically for example due to existing limitations of the hardware/electronics that is used to integrate the photocurrent signal. (Indeed conventional electronics used to integrate the photocurrent signal may be operated at frame rates of about 1 Mfps (mega frames per second) but such operating at such high fps using the conventional techniques can be done only for a small ROI (region of interest) and for a short period of time. In this regards, it might be also noted that the achievable rates of the analogue to digital output utilities of the conventional imaging systems (which generally comprised of row and column wires with pixel select switches and common pixel matrix A/D converted) are limited by the operation rates pixel select switches and common pixel matrix A/D converter which impose limitation on the output frame rate.

On the other hand, other conventional imaging techniques which are based in digital in-pixel processing (i.e., also known as digital pixel such as that disclosed by Schultz work from Lincoln Lab at MIT e.g., utilizing Pulse Frequency Modulation (PFM) and Sigma Delta Modulation (SDM).) which may indeed achieve high frame rates, are generally deficient in the size of the pixel matrix, or in other words are limited in their achievable pixel density (number of pixels per square inch) and also are associated with relatively high production costs. For instance readout circuits, which are based on digital inter pixel processing, may currently achieve pixel density of not more than about 1 Million pixels per square inch (where for comparison readout circuits with analog inter pixel processing—namely integration of the photocurrent, can achieve much higher pixel densities in the order of about 100 Million pixels per square inch). This is due to that fact that digital electronic components required for digitizing the photocurrent with sufficient bit-depth (e.g., with bit depths of 8, 10, or 14 bit per pixel) are relatively large (i.e., substantially larger than the achievable small sizes of the photodetectors in the pixel matrix), while furthermore utilizing such digital inter pixel processing technologies requires passage of multiple bit lines to each inter pixel processing/readout circuit (i.e., in the order of 10 bit lines e.g., 8, 10 or 14 dependent on the required bit depth), whereby the relatively number of required bit lines per each pixel by itself required accommodating space on such digital readout circuit, thus imposing further limitation on the achievable pixel density.

Indeed, U.S. Pat. No. 9,215,386, which is assigned to the assignee of the present application, provides a readout circuit capable of both integrating the photocurrent signal at a frame rate to provide imaging readout, and in parallel performing event detection by processing the photocurrent to determine whether an abrupt change occurred therein and outputting a digital signal (e.g., bit) indicative of such abrupt change). The technique disclosed in this patent is indeed suitable for rapid detection of laser signal of a laser ranger (e.g., in LIDAR or LADAR systems), or for obtaining information indicative that a rapid event had occurred. Also, indeed the technique disclosed can indeed be used for high frame rate imaging, However, in order to achieve that additional information is required to be outputted at the high rate from the pixel's readout circuit, that is not only the information about the mare occurrence of the event (the mere occurrence of a change in the photocurrent sensed by the photodetector, but also additional information indicating the direction of such change—namely whether the photo-current of the pixel's photodetector is became higher, lower, or maintained substantially constant.

To this end, the present invention provided a novel approach for reading out imaging data information from light sensitive pixels of a pixel matrix, in such a way that both high rates of light sensing information can be obtained and readout from the light sensing pixels and also high density of pixels in the pixel matrix is obtainable with moderate fabrication costs.

This is achieved by utilizing a pixel matrix comprising a hybrid inter pixel readout circuit that includes a combination of analog and digital inter pixel processing (indeed as indicated above the digital processing may be per each pixel or may be common to several inter-pixel processing readout circuits associated with batch of pixels). The analogue inter-pixel processing circuit (also referred to herein below interchangeably as pixel integration circuits may be configured and operable for integrating the photocurrent of the light sensitive pixel at the conventionally achievable imaging frame rates for this type of circuit (e.g., which are currently in the order of handers of HZs and up to about 1 KHz). However, the present invention utilizes an additional digital inter-pixel processing circuit (also referred to herein below interchangeably as pixel derivation circuits), per each batch of one or more pixels, in order to complement the relatively low frame rate information from the analogue inter-pixel processing circuit, with additional digital information/data about the derivative of the photocurrent which is provided at a second rate much higher than the imaging frame rates of the analogue inter-pixel processing circuit. Yet, according to the present invention the digital information/data provided by the digital inter-pixel processing circuit is provided only in addition to the integrated photocurrent signals from the analogue inter-pixel processing circuit. Therefore, there is actually no need to calculate and output the digital data with high bit-depth. In fact, as long as the digital data provided at the second date includes at least 1.5 bits (or more) provided at the second rate (namely is indicative of the photocurrent derivative being either: UP; DOWN; or CONSTANT at each time slot of the second rate). Indeed, in that case, based on the above mentioned information, namely: (i) integrated photocurrent signal provided by the analogue inter-pixel processing circuit at the lower imaging frame rate; and (ii) the digital data of at least 1.5 bit or 2 bit or higher, provided at the higher second rate; the entire video footage, or portions thereof can be post-processed/reconstructed with video footage frame rate that matches the higher second rate. It should be noted that here the figure of nominal 1.5 bits is used herein to designate the nominal number of bits required to communicate the above three digital states of the photocurrent's derivative: UP; DOWN; and CONSTANT.

Figure 2A:
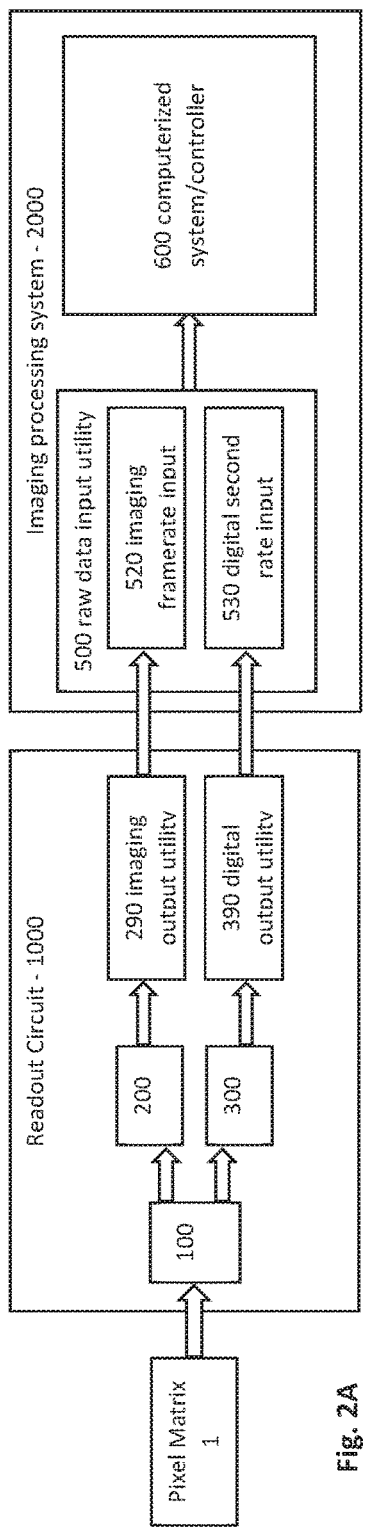
FIG. 2A is a block diagram of an imaging processing system 2000 according to an embodiment of the present invention.
Figure 2B:
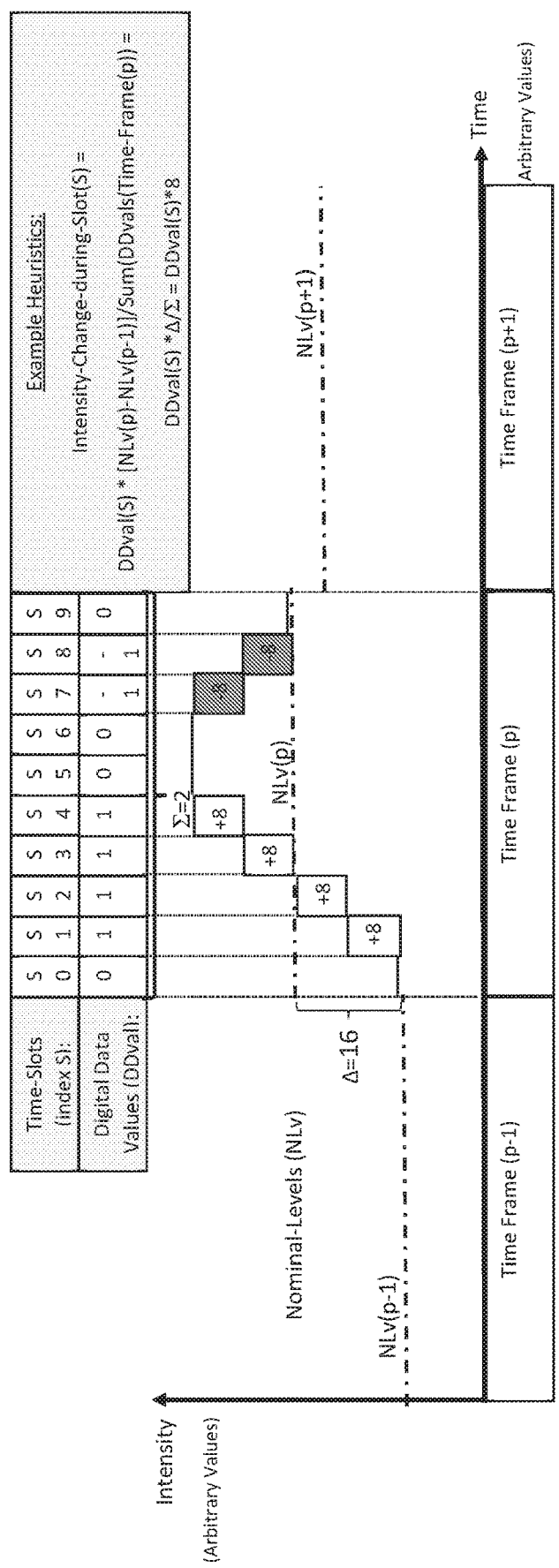
FIGS. 2B and 2C are schematic illustrations exemplifying two heuristic processing schemes which may be implemented by the imaging processing system 2000 of FIG. 2A in order to reconstruct video footage or portion thereof frame rate higher than the imaging frame rate.
Figure 2C:
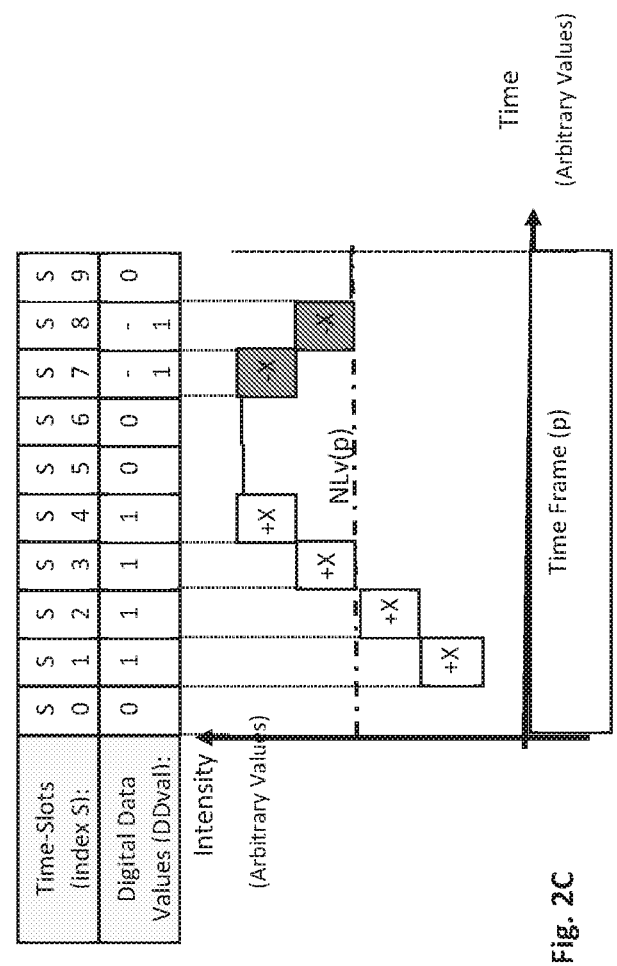

In this regards, referring now together to FIGS. 2A to 2C, in which FIG. 2A shows a block diagram of an imaging processing system 2000 according to an embodiment of the present invention, and FIGS. 2B and 2C schematically exemplify two heuristic processing schemes which may be implemented/performed by the imaging processing system 2000 in order to reconstruct video footage or portion thereof frame rate higher than the imaging frame rate (e.g., with time resolution as high as the above indicated second rate) as shown for example in FIG. 2B, or at least obtain an inter-frame intensity change profile for at least some pixels or clusters of pixels of the video footage with time resolution higher than the imaging frame rate.

The imaging processing system 2000 is adapted for connecting to the imaging output readout utility 290 and to the digital output utility 390 of the readout circuit 1000 of the present invention (such as that shown in FIG. 1A) and configured and operable for processing the outputs from output utilities 290 and 390 to reconstruct a video footage or at least a part thereof (i.e., at least/some pixels of such video footage), with video footage frame rate (or pixel refresh rates) in the order of the higher second rate at which the digital data is provided by output utility 390 (this is despite the low bit depths, e.g., down to 1.5 to 2 bits at which such digital data is provided). In order words the imaging processing system 2000 is capable of constructing video information at a video frame rate that is higher than the imaging frame rate provided via the imaging output readout utility 290. The imaging processing system 2000 may include raw data input utility 500 configured for connecting to the imaging output utility 290 and to the digital output utility 390 of the readout circuit 1000 to receive raw image data/signals therefrom, an imaging processor (e.g., a computerized system/controller 600 adapted to process the raw image data provided from the output utilities 290 and 390 to reconstruct video footage or parts thereof with high frame rates higher than the imaging frame rate.

The raw data input utility 500 comprises an imaging frame rate input module 520 that is adapted to obtain, from the imaging output readout utility 290 of the readout circuit 1000, imaging data/signals (in digital or analogue form) which are indicative of the values of the integrated analogue signals which are integrated by Integration circuit 200 per pixel, during frame periods (whose durations are one over the frame rate). These values of the integrated analogue signals thus obtained imaging data/signals are indicative of the nominal level (e.g., average level) of the light intensity sensed by each light sensitive pixel of the pixel matrix during each frame period. FIGS. 2B to 2D schematically show, in dot-dashed lines, the nominal/average levels NLv (P−1), NLv(P), NLv(P+1) of the intensity sensed by a pixel (e.g., photodetector 10.*i* or 10.1 shown in FIG. 1A) during three respective consecutive image frames indexed p: Time-Frame(P−1), Time-Frame(P), Time-Frame(P+1). The average levels NLv(P−1), NLv(P), NLv(P+1) are generally indicative of the integral photocurrent (integrated charge) which is sensed by the photodetector (e.g., 10.*i* or 10.1), integrated by the respective integration circuit (e.g., 200.*i* or 200.1) during the respective time frames and outputted via the output utility 290 at the imaging frame rate. To this end, the an imaging frame rate input module 520, obtained from the readout circuit 1000 raw video data comprising image frames at the imaging frame rate.

The raw data input utility 500 also includes a digital second rate input module 530 that is adapted to obtained the digitized data from the digital output readout 390 utility at the second rate. The digitized data is indicative of the derivative/change in the sensed intensity by the pixel (e.g., 10.*i* or by the cluster of pixels 10.1 to 10.4) as derivate by the respective derivation circuit (e.g., 300.*j* or 300.1) with the second rate, and outputted by the digital output readout 390. In the present non limiting example of FIGS. 2B and 2C, the second rate is (only) 10 times higher than the imaging frame rate (it should be understood that in various embodiments implementations capable of higher or lower ratios between the second rate and the imaging frame rate are possible. For clarity, in the example of FIGS. 2B and 2C, the obtained digitized data is illustrated only for the image frame p: Time-Frame(P). Accordingly, as shown, the time frame is divided (by asterisk lines) to 10 inter-frame time slots indexed S0 to S9 (10 being the ratio of the second rate to the imaging frame rate). Also, in this example the digitized data is at the minimal of 1.5 bit per the second rate period (one over the second rate). In other words for the respective pixel/cluster (e.g., pixel 10.*i* or cluster 10.1 to 10.4), and per each of the inter-frame time slots S0 to S9, the digital data in this case only indicates whether the sensed light intensity value (by the pixel or cluster) was substantially increased, substantially decreased, or remained substantially constant, relative to the preceding time slot.

In turn, the computerized system/controller 600 of the imaging processing system 2000 is adapted to process the raw image data provided to the raw data input utility 500 to reconstruct video footage or parts thereof with time resolution higher than the imaging frame rate.

For instance the computerized system/controller 600 may be adapted to process the digitized data (namely the data provided by the digital second rate input module 530) at the second rate, to determine for one or more time slots S0 to S9 of the second rate whether the change in the total electric signal of at least one cluster of one or more respective light sensitive pixels (e.g., pixel 10.*i* or cluster 10.1 to 10.4), is above the predetermined upper threshold or below the predetermined lower threshold (such change indicates that the intensity sensed by the one or more respective light sensitive pixels was rapidly changing (increased or decreased with time resolution higher than the imaging frame rate). Upon determining such change, values of corresponding pixels/clusters in the video data may be updated with high video frame rate which may be as high as the second rate (as shown in FIG. 2B) or the inter-frame intensity time profile of the corresponding pixels/clusters may be reconstructed (as shown in FIG. 2C).

For example, FIG. 2B illustrates a first order reconstruction of certain pixel(s) (e.g., pixel 10.*i* or cluster 10.1 to 10.4) of the video footage with rate matching the higher second rate at which the digital data (intensity derivative data) is measured by the readout circuit 1000. In this example a first order heuristics is used to estimate the intensity measures of the respective pixel(s) at each of the inter-frame time slots S0 to S9 of the image frame p, Time-Frame(P), based on the digital derivative data values DDval obtained from the derivation circuit(s) 300 of the respective pixel(s)) for the inter frame time slots S0 to S9 and the average intensity level NLv(P) of the Time-Frame (P) (as obtained from the integration circuit(s) 200 of the respective pixel(s)) and the average intensity level NLv(P−1) of the preceding Time-Frame(P−1) and/or the average intensity level NLv(P+1) of the proceeding Time-Frame(P+1). For instant per each time slot S the intensity level of the time slot Intensity-Change-during-Slot(S) can be estimate as:

$$\text{Int}(S) = \text{DDval}(S) * [\text{NLv}(p) - \text{NLv}(p-1)] / \text{Sum}(\text{DDvals (Time-Frame}(p)))$$

Wherein here DDval(S) indicates the intensity derivative value (which in this specific example may acquire either −1, 0 or +1 values) during the time slot S; the term NLv(p)-NLv(p−1) also indicated as $\Delta$ is the difference between the average intensity levels of the current time frame and the preceding time frame [NLv(P)-NLv(P−1)]; and the Sum of DDvals(Time-Frame(p)) also indicated as $\Sigma$ is the summation of the derivative values of time slots S0 to S9 during the instant time frame Time-Frame(p).

Thus the measured intensity Int(S) during the time slot S of the respective pixel can be estimated as: Int(S)= DDval(S)*($\Delta/\Sigma$).

In this regards, it should be noted that in some embodiments the intensity derivative values are measured for cluster of more than one pixel (e.g., in the case the respective pixel is one of the cluster 10.1 to 10.4 for which the readout circuit includes a common derivation circuit 300.1. In this case the values DDval(S) and E in the above heuristics are common to all the pixels in the cluster (and this case the "unscaled" inter-frame intensity profiles obtained for all the pixels in the cluster are similar 10.1 to 10.4. Nonetheless, the scaling factor A, (which is the difference between the average intensity levels of the current time frame and the preceding time frame [NLv(P)-NLv(P−1)] or in some embodiments the difference between the average intensity levels of the proceeding time frame and the current time frame [NLv(P+1)-NLv(P)]) may of the different from pixel to pixel of the cluster (e.g., different for the pixels 10.1 and 10.2 in the cluster of 10.1 and 10.4) in order to obtain continuity of the intensity levels in between successive time frames P−1, P, P+1 of the video.

As illustrated in FIG. 2C, in some embodiments only the inter-frame structure/profile of the intensity level of a pixel or a pixels' cluster may be of interest. In such cases there may be no need to maintain continuity of the intensity levels in between successive time frames. For instance, in some case the inter-frame intensity profile of one or more pixels may be used to determine whether an abrupt change in the average intensity levels between time frames, e.g., between NLv(P), and NLv(P+1) or NLv(P−1) is associated with one type of flash event or another type (i.e., in order to determine/estimate the type of the flash event. Here the phrase flash event indicates any even associated with rapid illumination intensity change sensed by the pixels, such as:

Fluorescent events in biomedical images. Particularly in endoscopy where also the communication bandwidth is very limited. For example conventional imaging in "Given Imaging" capsule is 256×256 pixel at 2 fps, with conventional imaging, the capsule is unable to recognize fast events like fluorescent response, yet utilizing pixel readout circuit of the present invention such fast fluorescent response events can be recognized.

Glares detection for automotive and robotic systems. By inter-frame profile a fast glare (which has a random time profile) can be recognized from a real fast event, for example a bird crossing the landscape.

Thus in such cases the magnitude/scaling-factor (Δ/Σ) of the intensity change in the time slots may not be required and a "zero" order estimation (not resorting to the average intensity values of adjacent time frames) may be used in order to obtain/estimate the shape (not scaled) of the inter-frame intensity profile per each pixel/cluster (e.g., pixel 10.*i* or cluster 10.1 to 10.4) for which the intensity derivative value DDval(S) is provided. For instance, as shown in FIG. 2C, the shape of the inter-frame intensity profile can be estimated with time resolution up to the second rate as follows:

$$\text{Un-Scaled-Intensity-Change-during-Slot}(S) = -X^* \text{DDval}(S);$$

Here X is an arbitrary scaling which may be for example 1.

It should be noted that higher order heuristics (e.g., second order heuristics) may be used in order to obtained a more accurate estimation of the inter-frame intensity profile for each pixel/cluster. For instance using the second order heuristics based on the average intensity levels of the current time frame and both the preceding and proceeding time frames (NLv(P), NLv(P−1), NLv(P−1)), inter-frame intensity profile with variable magnitudes of the Intensity-Change-during-Slot(S) may be estimated to further more accurately reconstruct the inter-frame intensity values sensed by the pixel/cluster. Referring back together to FIGS. 1A to 2C, the configuration and operation of the readout circuit 1000 according to various embodiments of the present invention will now be described in more details. The readout circuit 1000 of the present invention generally includes:

(a) An array of pixel integration circuits 200. Each pixel integration circuit, e.g., 200.*i*, is adapted for electrically connecting directly or indirectly (e.g., preferably via suitable front end circuit) to a respective light sensitive pixel (which is also referred to interchangeably herein as photodetector), e.g., 10.*i*, of the pixel matrix 10 (also referred to interchangeably herein as photodetector array (PDA)) for receiving an electric signal indicative of the photocurrent produced by the respective pixel 10.*i*. The pixel integration circuits, 200, are respectively configured and operable for integrating the electric signal indicative of the photocurrent of the pixels over an imaging frame period to thereby produce integrated analogue signals indicative of an image sensed by the array of pixel integration circuits during the image frame period (in various embodiments the readout circuit may be configured for producing such image as a rolling shutter image or a global shutter image). The array of pixel integration circuits 200 is associated with an imaging output readout utility 290 enabling readout of the integrated analogue signals of the pixels in any one of digital or analogue forms/representations, and at an imaging frame rate being one over the frame period.

(b) An array of pixel derivation circuits 300. Each pixel derivation circuit, e.g., 300.*j*, is configured and operable for electrically connecting (e.g., directly or indirectly via front end circuit(s)) to a cluster of one or more pixels (e.g., 10.*i*—being a cluster of single pixel, or 10.1 to 10.4 being a cluster of four pixels) for receiving electric signal(s) indicative of the photocurrent(s) produced by the respective pixels of the cluster. The electric signal(s) of the pixels of the clutter are together referred to herein as total electric signal, and generally include at least a component of the electric signals of the pixels of the cluster (a none constant component of the photocurrents (e.g., AC component) indicative of the variation/derivative of the of the total photocurrent produced by the cluster's pixels. Each derivation circuit, e.g., 300.*j*, 300 is configured and operable to analyze the total electric signal obtained from it's respective pixel cluster to determine digital data indicative of at least the sign of the derivative of the total electric signal, while performing that at a second rate (which may be much higher than the imaging frame rate at which the integration circuits 200 operate or read out). For example, the sign of the derivative of the total electric signal may be determined by comparing the change in the total electric with one or more thresholds to determine whether it is above a predetermined upper threshold (indicating positive derivative of the photocurrent(s) of the pixels in the cluster), below a predetermined lower threshold (indicating negative derivative of such photocurrents), or in between the predetermined upper and lower thresholds (indicating substantially zero derivative of such photocurrents).

Figure 1B:
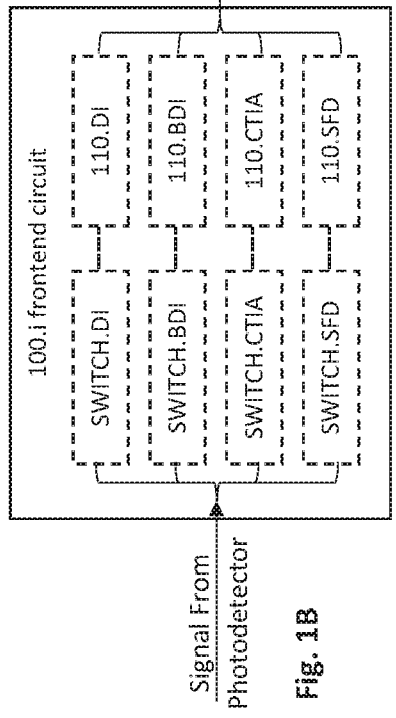

In some embodiments the readout circuit 1000 also includes an array 100 of front end circuits 100.1 to 100.*n* configured and operable for properly interfacing to the respective pixels/photodetectors 10.1 to 10.*n* of the pixel matrix 1 for generating/obtaining the respective electric signals indicative of the photocurrents in those pixels. As illustrated in FIG. 1B, each of the front end circuits 100.1 to 100.*n*, e.g., 100.*i*, may be configured with any suitable type of photo detection front end circuitry scheme such as optionally: direct injection (DI) circuits 110.DI, buffered direct injection (BDI) circuits 110.BDI, capacitive transimpedance amplification (CTIA) circuits 110.CTIA, source follower (SF) circuits/structures 110.SFD, and/or any other suitable front-end circuit scheme. In some cases the front end circuit 100.*i* may include a combination of one or more of the above front end circuitry schemes, DI, BDI, CTIA, SF and/or other, and may further optionally include a set of control switches, such as SWITCH.DI, SWITCH.BDI, SWITCH.CTIA and SWITCH.SFD (but not necessarily in the configuration depicted in the figure) enabling to selected one or more the front end scheme by which an electric signal indicative of the photocurrent in the respective pixel, e.g., 10.*i* is generated/extracted. For example selection of the proper front end scheme may be based on the noise conditions/level in the signal, and/or other considerations such as: the magnitude of the photocurrent signal, the desired/required integration time, and/or the bandwidth, and/or the photodetector (e.g., photodiode) response and conductivity. In some embodiments the switches are configured/arranged in the front end circuit 100.*i* to allow parallel/concurrent operation of several front end schemes (e.g., as shown in FIG. 2B) or in other configuration allowing only a single front end scheme at each time.

In turn, as illustrated in FIG. 1A, the pixel integration circuits 200 and/or the pixel derivation circuits 300 may be connected to the respective front end circuits 100 of the pixel(s) associated therewith for receiving therefrom the electric signals indicative of the photocurrents at those respective pixel (indirect connection). Alternatively, in some cases the pixel integration circuits 200 and/or the pixel derivation circuits 300 may be directly connected to the respective light sensitive pixel pixels/photodetectors of the pixel matrix.

Figure 1C:
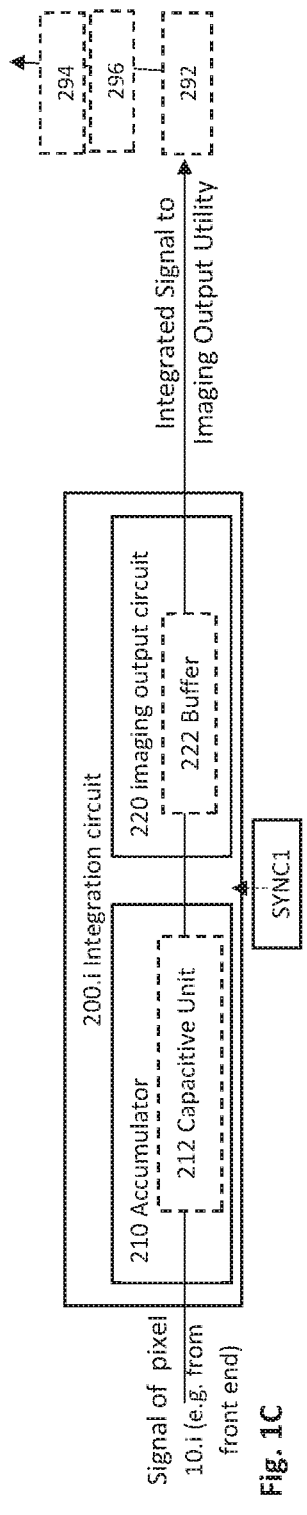

An example of a pixel integration circuit 200.*i*, exemplifying one instance of the pixel integration circuits of the array 200, is illustrated in more details in FIG. 1C. The pixel integration circuit includes an accumulator module 200 connectable to an input channel for receiving (e.g., from its respective photodetector 10.*i* or from a front end circuit associated therewith 100.*i*) an electric signal indicative of the photocurrent produced at the respective pixel 10.*i*. The accumulator module 200 is configured and operable for integrating the received electric signal for a time frame period (e.g., until it is readout/flushed) to produce an accumulated signal indicative of received intensity generated by the respective light sensitive pixel of the pixel matrix during said frame period. In some implementations the accumulator module 200 includes as a capacitive unit 212, which may for example include at least one capacitor, connected for receiving the electric signal associated with the respective pixel 10.*i* and accumulating a charge corresponding to the electric signal thereby producing an integrated signal (e.g., voltage on the capacitive unit) indicative of the integral light intensity sensed by the respective light sensitive pixel 10.*i* of the pixel matrix 1 during the frame period.

Generally, the pixel integration circuit 200.*i* is associated with, or includes an imaging output circuit 220 associated with the imaging readout utility 290 (e.g., connectable to a column wire 292 of the imaging readout utility 290) and connectable to the accumulator 210 (e.g., to the capacitive unit 212). The imaging output circuit 220 is configured and operable to enabling readout of an integrated signal (e.g., indicative of the accumulated charge on the capacitive unit 212, and may accordingly include one or more switches enabling to selectively perform such readout. Also, optionally in some embodiments the imaging output circuit 220 also includes a buffer 222 interconnected in between the accumulator 210 and the imaging readout utility 290, and configured and operable for buffering the integrated signal (e.g., the charge accumulated charge on the capacitive unit 212) until readout operation from the integration circuit 200.*i* is performed by the imaging readout utility 290 (e.g., by switching on respective pixel select switches of the respective pixel 10.*i* by the imaging readout utility 290). The buffer may for example include one or more capacitors for storing the charge from the capacitive unit. Such optional buffer 222 may also include a respective switch operable in synchronization with the imaging frame rate (e.g., via a sync signal operation the switch) such that the accumulated/integrate signal from the accumulators 210 of all the pixel integration circuits 200 can be drawn to their respective buffer in synchronization to thereby enable global shutter operation of the readout circuit 1000 (this is versus rolling shutter operation). To this end, the imaging output circuit 220 may be implemented as an analogue circuit including a buffer controllably linked to the capacitive unit (e.g., via a switch synced with the frame rate) and controllably lined to the general imaging readout utility 290 of the readout circuit 1000 (e.g., optionally via column and row wires, 292 and 294, and respective signal select switch(es) 296 of the imaging readout utility 290, as generally known in the art) to thereby adapted for reading out signal indicative of the accumulated charge.

Figure 1D:
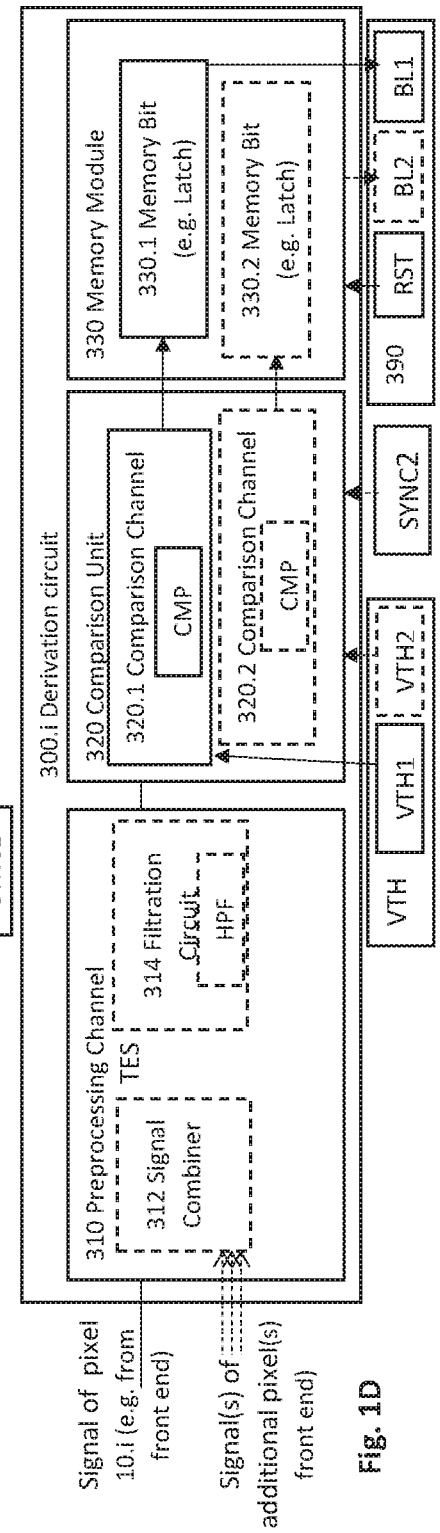

An example of a pixel derivation circuit 300.*j*, exemplifying one instance of the pixel derivation circuits of the array 300, is illustrated in more details in FIG. 1D. The pixel derivation circuit 300.*j* includes a signal preprocessing channel 310, a comparison unit 320 and memory module 330 connectable to the digital output utility 390 which is associated with the array 300 of pixel derivation circuits.

The signal preprocessing channel 310 is configured and operable for electrically connecting to one or more pixels (also referred to herein as cluster of pixels), for example to pixel 10.*i* and optionally to additional pixels of the pixel matrix. Generally the connection may be via the front end input circuit(s) of the respective light sensitive pixel, or cluster thereof, to which the derivation circuit 300.*j* is connected, or Alternatively, directly to the respective pixel or cluster of the pixel matrix, for receiving the electric signals associated with the total photocurrents produced at these pixel(s). In case the signal preprocessing channel 310 connects to a cluster of more than one pixels, it may include a signal combiner configured and operable for combining the electric signals of the pixels of the cluster to obtain a total electric signal TES including at least component of the electric signals of the one or more front end input circuits indicative of the photocurrents of the one or more respective light sensitive pixels of the cluster. In the following for clarity, the electric signal further processed/analyzed by the signal preprocessing channel 310 is referred to as total electric signal TES irrespective of whether the cluster includes one or a plurality of pixels.

The preprocessing channel 310 optionally also includes a filtration circuit 314 which is configured and operable for filtering out/removing at least partially, a DC (direct current) component for the total electric signal TES such that the remaining total electric signal TES substantially represents an AC component of the sum/combined signals of the pixels of the cluster which is indicative of a variation in the electric signals (e.g., associated with variation/derivative of the photocurrent(s) produced by the pixels of the cluster that are connect to the respective derivation circuit 300.j. In some implementations such filtration circuit 314 includes, or is implemented as a high pass filter HPF. To this end, the high pass filter HPF for obtaining the AC component of the signal, may be implemented for example using a suitable capacitor connected in series, or as a bandpass filter (BPS) such as Semi-Gaussian shaper. Alternatively or additionally, in some embodiments, the readout circuit 1000 includes/incorporates a filtration circuit 314 of specifically designed configuration, as described in FIGS. 5A and 5B below, which advantageously provides high path filtration while with suppressed high frequency noise.

The comparison unit 320 is configured and operable adapted to analyze the total signal TES (e.g., after its filtration as indicated above) to determine digital data DDval indicative of whether a change in the total electric signal TES is above a predetermined upper threshold, below a predetermined lower threshold, or in between said predetermined upper and lower thresholds. To this end, the comparison unit 320 may be connectable to an input threshold signal source VTH adapted to provide one or more input threshold signals indicative of the predetermined upper and lower thresholds. Thus results of such comparisons of the total electric signal TES with the upper and lower thresholds, provide digital data DDval indicative of the derivative of the photocurrent(s) of the pixels of the respective cluster associated with derivation circuit 300.j.

Accordingly, the comparison unit 320 is connected to the memory module 330 The memory module 330 may be implemented as a digital memory including one or more latches (e.g., latch 330.1 and optionally additional latch 330.2) associated with respective bit line(s) of digital output utility 390 (e.g., bit line BL1 and optionally additional bit line BL2) and with a reset line/channel RST of the digital output utility 390. The memory module 330 is adapted for storing the results of the above described comparisons to enable their output/readout at the second rate via the bit line(s) of the digital output utility 390 and reset of the stored values once read, via the reset line of the digital output utility 390. This thereby enables readout of the digitized photocurrent derivative data DDval at a second rate higher than said frame rate.

In this regards the comparison unit may include one or more comparison channels, 320.1 and optionally also 320.2, each associated with a respective bit line, BL1 and optional BL2, being part of digital output circuit of digital readout utility 390. The one or more comparison channels, 320.1 and optional 320.2, are configured and operable for comparing said total electric signal TES with the predetermined upper and lower thresholds VTH (e.g., which may be provided via a single reference signal VTH1 or via two reference signals VTH1 and optional VTH2 which may be needed in case controllably different upper and lower threshold are desired. Each comparison channel, 320.1 and optional 320.2, may for example include a comparator CMP whose inputs are connectable to the preprocessing channel and to the reference signal source VTH (also referred to herein as reference voltage channel) which provide at least one of the upper and lower thresholds, VTH1 and optional VTH2. a latch (e.g., a bit memory unit) connectable to an output of the comparator of storing at least one bit of said digitized photocurrent derivative data resulting from said comparing; The output of each comparison channel, 320.1 and optional 320.2, (e.g., the output of the comparator CMP of each channel) may be connected to a respective memory-bit/latch of the memory module 330, e.g., to latches 330.1 and optional 330.2 respectively, for outputting at least one bit resulting from the comparison by the respective comparison channel, 320.1 and optional 320.2, via the respective bit line, BL1 and optional BL2, associated with the respective latch 330.1. Once the respective bit(s) are outputted, the memory bits (latches), 330.1 and optional 330.2, is/are reset via the reset channel RST.

It should be noted that the digital output utility 390 is adapted to enable readout of the digitized photocurrent derivative data from the pixel derivation circuits 300.j at a second rate being typically one or more orders of magnitude higher than the imaging frame rate by which the pixel integration circuits 200 operate. For instance the imaging frame rate may be in the order of hundreds of Hertz (e.g., 500 Hz) and the second rate may be in the order of Kilo-Hertz and up to tens of Kilo-Hertz. To this end, the pixel derivation circuits 300.j may include a synchronization signal source SYNC2 (also referred to herein interchangeable and without limitation as a modulated signal source) which provides a synchronization signal for synchronizing the operation of the pixel derivation circuits 300.j at the second rate. The synchronization signal provided by the synchronization signal source SYNC2 may be for example a signal modulate at the second rate, or an integer multiple thereof, and may be connectable to the memory module 330 and optionally also to the comparison unit/channels 320 and to the reset channel RST in order to sync their operations such that the comparison, subsequent storage of the comparison results in the memory, and the readout and reset of the memory are synced at the second rate.

It should be noted that in various embodiments the readout circuit 1000 may or may not be adapted for derivate the photocurrents of all the pixels and in some embodiments some pixels (e.g., pixels located in the periphery of the pixel matrix, or in other embodiments pixels located in the center of the pixel matrix, may or may not be associated with a derivation circuit (see for instance pixel/photo-detector 10.n in FIG. 1A which is not associated with any pixel derivation circuit). Also in some embodiments some pixels (or all pixels) may be clustered to common derivation circuit. For instance in some specific embodiments certain pixel clusters include four adjacent pixels (see for instance pixels 10.1 to 10.4 in FIG. 1A) for which a common pixel derivation circuit (e.g., 300.1) is utilized. This enables to determine/estimate the inter-frame profile of the intensity commonly sensed by the pixels of the cluster). In some embodiments certain pixel clusters include one pixel (see for instance pixel 10.i in FIG. 1A) having dedicated pixel derivation circuit for that pixel (e.g., 300.j). Also in some cases (e.g., mixed configuration) some pixels are clustered together to the common derivation circuit (e.g., as pixels 10.1 to 10.4 in FIG. 1A), while others may have dedicated pixel derivation circuit (e.g., pixel 10.i) or may not be associated with any derivation circuit (e.g., pixel 10.n). This may depends on the application and the imaging system requirements. For instance in some cases it might be desired to enable reconstruction of the video with fast rate (e.g., with the second date), or determination of the inter-frame intensity time profile, only at the center of the image frame. In this case central pixels in the pixel matrix may be associated with derivation circuits (and may be clustered or not) while peripheral pixels in the matrix may not be associated with such derivation circuits or larger clusters of such peripheral pixels may be connected to the pixel derivation circuit (yielding the less accurate inter-frame intensity time profile. For other applications the opposite or a different special configuration of the derivation circuits may be desired (e.g., central pixels may not be associated with derivation circuits or may be connected to the derivations circuits in larger clusters, which peripheral pixels may be connected in smaller clusters (e.g., one to one connection) to the derivation circuits.

Reference is now made together to FIGS. 3A to 3E illustrating in self-explanatory manner the configuration and operation of the readout circuit 1000 according to another embodiments of the present invention. As indicated above the readout circuit 1000 is associated with (connected/connectable to) the plurality of pixels 10 of the pixel matrix 1. FIGS. 3A to 3E demonstrate examples of pixel readout circuits PROIC, being part (e.g., one of a plurality) of PROICs of the readout circuit 1000. The pixel readout circuits PROIC illustrated in this figure each connects to one pixel of the pixel matrix 1, e.g., 10.$i$, for integrating the photocurrent of that pixel, and optionally to additional pixels (to a cluster of pixels including 10.$i$) for derivating the total electric current (the total photocurrent) of the pixels in the cluster. Some elements/modules shown in 3A to 3E described above in details with reference to FIGS. 1A to 1D, which are referred to herein with the similar reference numerals, are not described in the following in more details and it should be understood that the above description of those elements/modules applies also to these figures except were explicitly stated or otherwise understood by a person of ordinary skill in the art.

As shown in this figure the integration channel 200.$i$ is connected to pixel 10.$i$ via front end circuit 100.$i$ and includes an accumulator 210 for integrating the photocurrent of the integrating the pixel 10.$i$ (or a signal indicative thereof) and a buffer 222 for storing the integration results for readout. The buffer 222 is connected to the imaging output utility 290 (e.g., optionally via column and raw wires and proper pixel select switches (not shown).

Figure 3A:
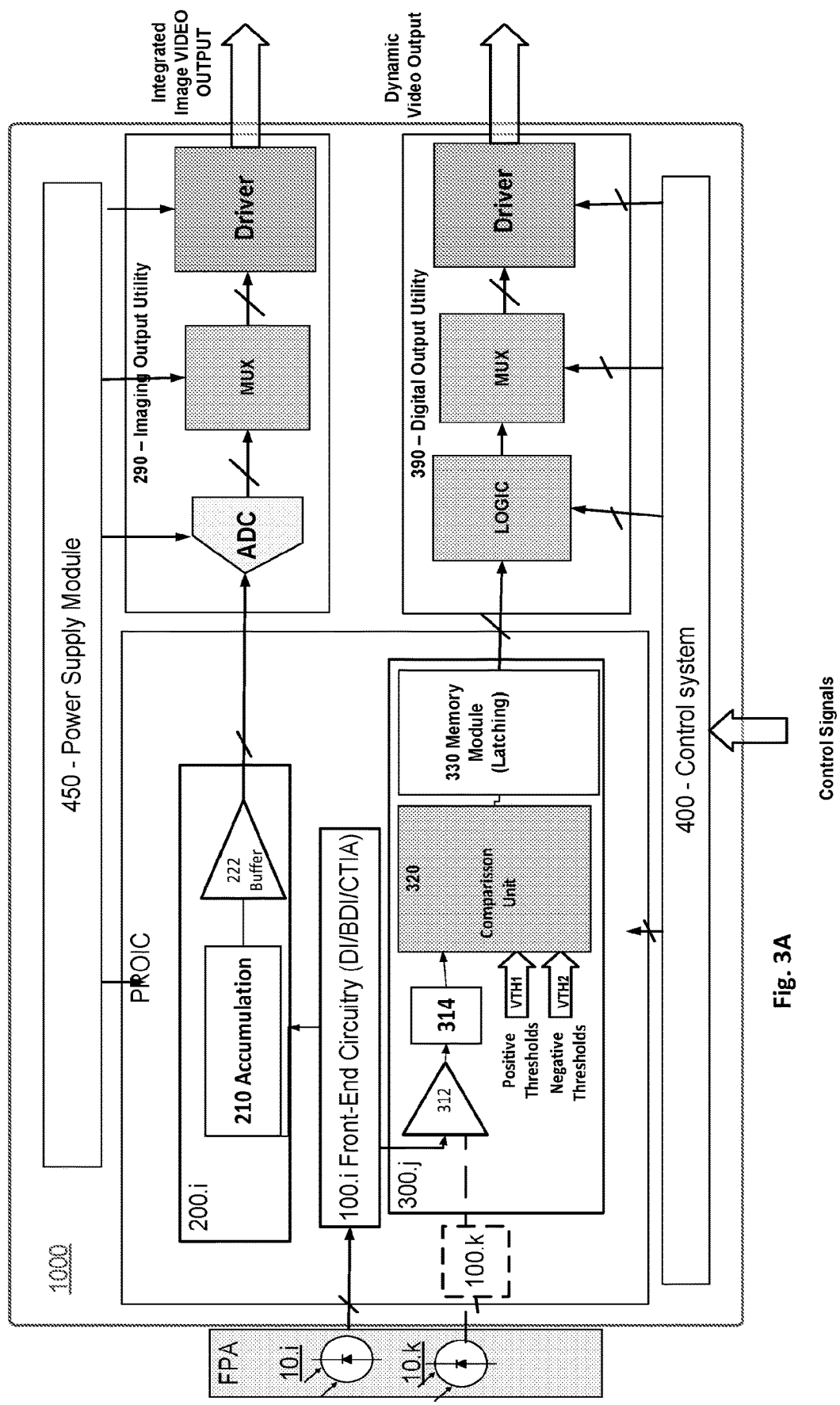

The example of FIG. 3A shows that the imaging output utility 290 includes an analog to digital converter ADC for converting the analogue signal on the buffer to digital signal representation (e.g., converting to 10 bit digital signal representation, 14 bit representation of digital representation of higher bit-depth). Indeed as generally known in the art analogue to digital converters ADC are generally relatively costly in terms of the chip real-estate required to accommodate them and also their fabrication costs. Therefore, and also considering that the imaging frame rate is relatively low (e.g., in the order of hundreds of Hertz), the digital converter ADC of the imaging output utility 290 may not be dedicated to one pixel/PROIC, but may be configured and operable for converting the buffered signals of the plurality of PROICs (e.g., of all the PROICs) of the readout circuit 1000. This may be achieved by sequentially connecting the imaging output utility 290 to plurality of integration channels 200 of the readout circuit 1000 and converting their buffered signals one after the other. Accordingly only one or few ADCs may be used to serve the plurality, or all of the integration channels 200. To this end, despite the sequential readout and A/D convention of the buffered signals, global shutter operation of the system is enabled in cases where the operations of the accumulators 210 of the integration channels 200 are synced to operated together at the imaging frame rate (e.g., via SYNC1 signal shown in FIG. 1C). In some implementations the imaging output utility 290 also includes a readout multiplexed MUX configured and operable for multiplexing the buffered signals which are sequentially read from the integration channels 200 and converted to digital from. Additionally the imaging output utility 290 may also include a video driver DRIVER.

As also shown in FIGS. 3A to 3E, the derivation channel 300.$j$ is connected to pixel 10.$i$ and optionally to additional pixels (e.g., 10.$k$), optionally via respective front end circuits. The derivation channel 300.$j$ includes a filter 314 (e.g., AC signal filter) adapted to output an AC portion of the signal(s) received from the pixel(s) connected thereto, and a comparison unit 320 configured and operable at the second rate, as described above, for comparing the AC component with upper and lower thresholds (e.g., positive and negative thresholds), to obtain digitized data indicative whether a derivative of the photocurrent(s) of the respective pixels should be considered as substantially positive, negative or zero. In turn the memory unit 330 (e.g., one or more latches) store the results of such comparison for output via the digital output utility 390.

The example of FIG. 3A shows the digital output utility 390 optionally including a processor logic circuitry LOGIC configured and operable for managing the access (e.g., via synchronized sequential or parallel access or a combination thereof, or a-synchronized/selective access) to one or more of the memory units 330 of the plurality of derivation channels 300 of the readout circuit 1000, for reading out the digitized data stored therein via respective bit lines (e.g., BL1), and a readout multiplexer MUX configured and operable for multiplexing the digitized data obtained from the one or more memory units 330. Additionally the digital output utility 290 may also include a video driver DRIVER.

A power supply module 450 also shown in the figure may be connected to the various modules/circuits/channels of the readout circuit 1000, and a control system 400 which may be adapted for providing the various modules of the readout circuit 1000 with suitable control signals such as (optionally): SYNC1 signals for synchronizing the operations of the integration circuits 200 at the imaging frame rate; SYNC2 signals for synchronizing the operations of the derivation circuits 300 at the second frame rate; RST signals for resetting the memory units 330 at the second rate (e.g., may be similar or synchronized with the SYNC2 signals; and VTH signals indicative of the upper and lower thresholds according to which the sign of the photocurrent derivatives are determined/estimated.

Referring to FIGS. 3B to 3E, the integration circuit 200.$i$ as well as the front end circuit 100.$i$ and the preprocessing channel 310 (not specifically shown; e.g., the filter 314 and optional combiner 312 not shown) of the derivation circuit 300.$j$ may be similar to those described above with reference to FIG. 3A and FIGS. 1A to 1D.

Figure 3B:
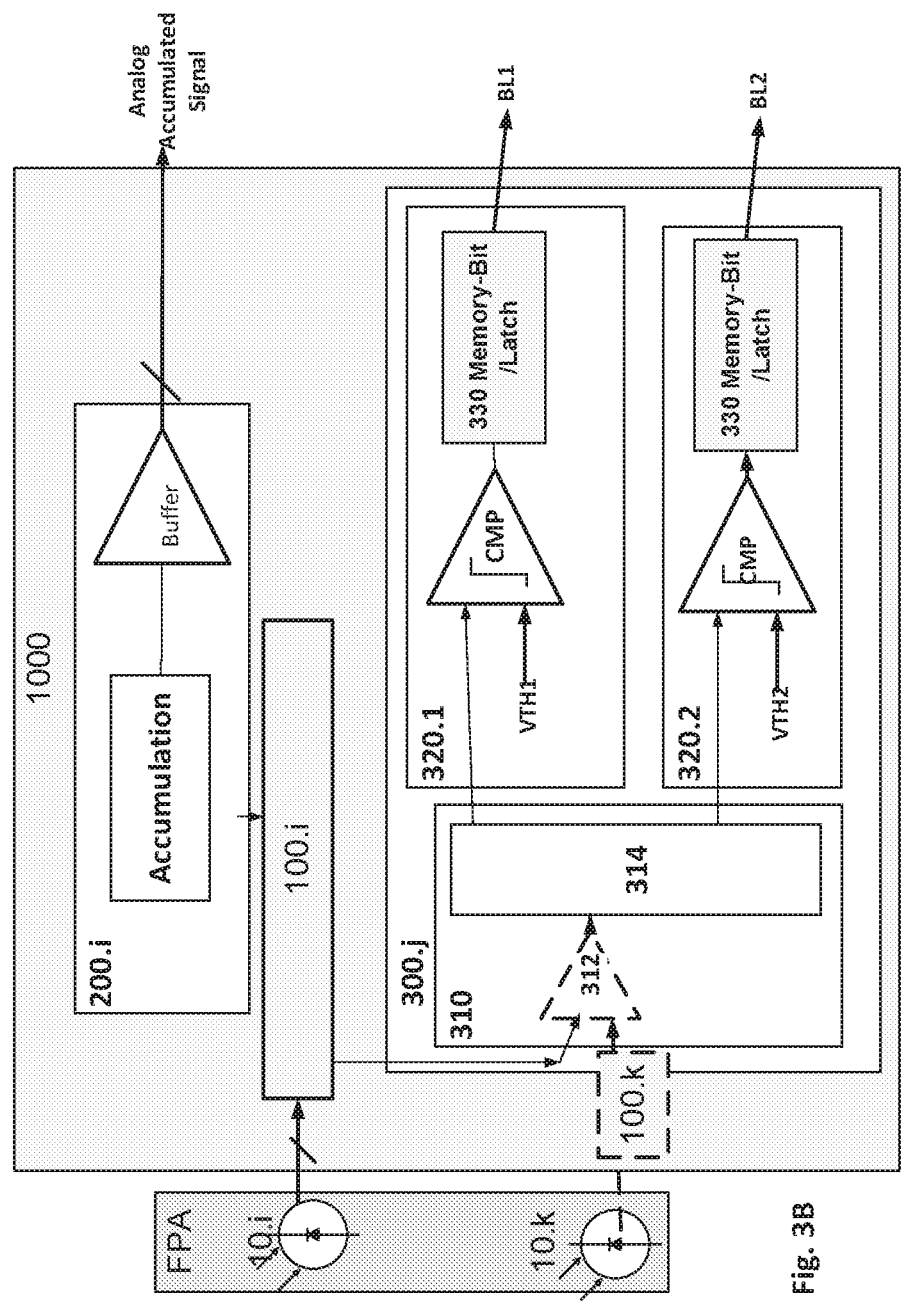

In the embodiment of the present invention illustrated in FIG. 3B, the comparison unit 320 of the derivation circuit 300.$j$ includes two comparison channels 320.1 and 320.2 associated with two respective memory bits (e.g., two latches) of the memory module 330 and two respective output bit-lines, BL1 and BL2. Both comparison channels 320.1 and 320.2 are connected to compare the same total electric signal TES obtained from the preprocessing module 310 (e.g., from the filter 314), whereby the reference threshold voltage VTH1 provided to the comparator CMP of a first one of the comparison channels 320.1 is indicative of the upper threshold according to which the positive sign of the derivative is determined, and the reference threshold voltage VTH2 provided to the comparator of the second one of the comparison channels 320.1 is indicative of the lower threshold according to which the negative sign of the derivative is determined. Accordingly two bits of data (e.g., typically concurrently stored in the memory module 330, can be outputted in parallel via the two bit lines BL1 and BL2. This enables readout of the digital data (two bits) indicative of the photocurrent derivative being positive, negative, or zero, via as little as two bit lines. To this end, the readout may be synchronized at the second (e.g., higher) rate, operated by a synchronization signal SYNC2, which may be for example a modulated signal whose modulation frequency matches the second rate or is an integer multiple thereof.

As indicated above, having a large plurality of lines/wires per each pixel readout circuit PROIC of a readout circuit 1000, may generally impose limitations on the pixels density and cost of the circuit. Therefore in various applications it may be desirable to further reduce the number of required bit lines per pixel (e.g., per pixel readout circuit PROIC) to as little as possible. Indeed, as compared to the conventional digital imaging readout circuits designs, in which 8 to 14 bit lines are included per each digital pixel (e.g., in order to digitally output bit depths of 10 to 14 bit per pixel), the pixel readout circuit 1000 of the embodiment of FIG. 3B includes only two bit lines for outputting the digital data plus additional wire (e.g., column wire) for outputting the analog integrated signal. However, for certain implementations it is be desired to further reduce the number of bit lines in the readout circuit 1000.

In order to reduce the amount of data and bit channels required for transmitting and processing the dynamic AC signal of the pixels (namely the derivatives of the photocurrents), combining positive and negative thresholds is desirable. A modulation method is used that further reduces the number of comparators latches and bits as described in several forms in FIGS. 3C to 3E.

Figure 3C:
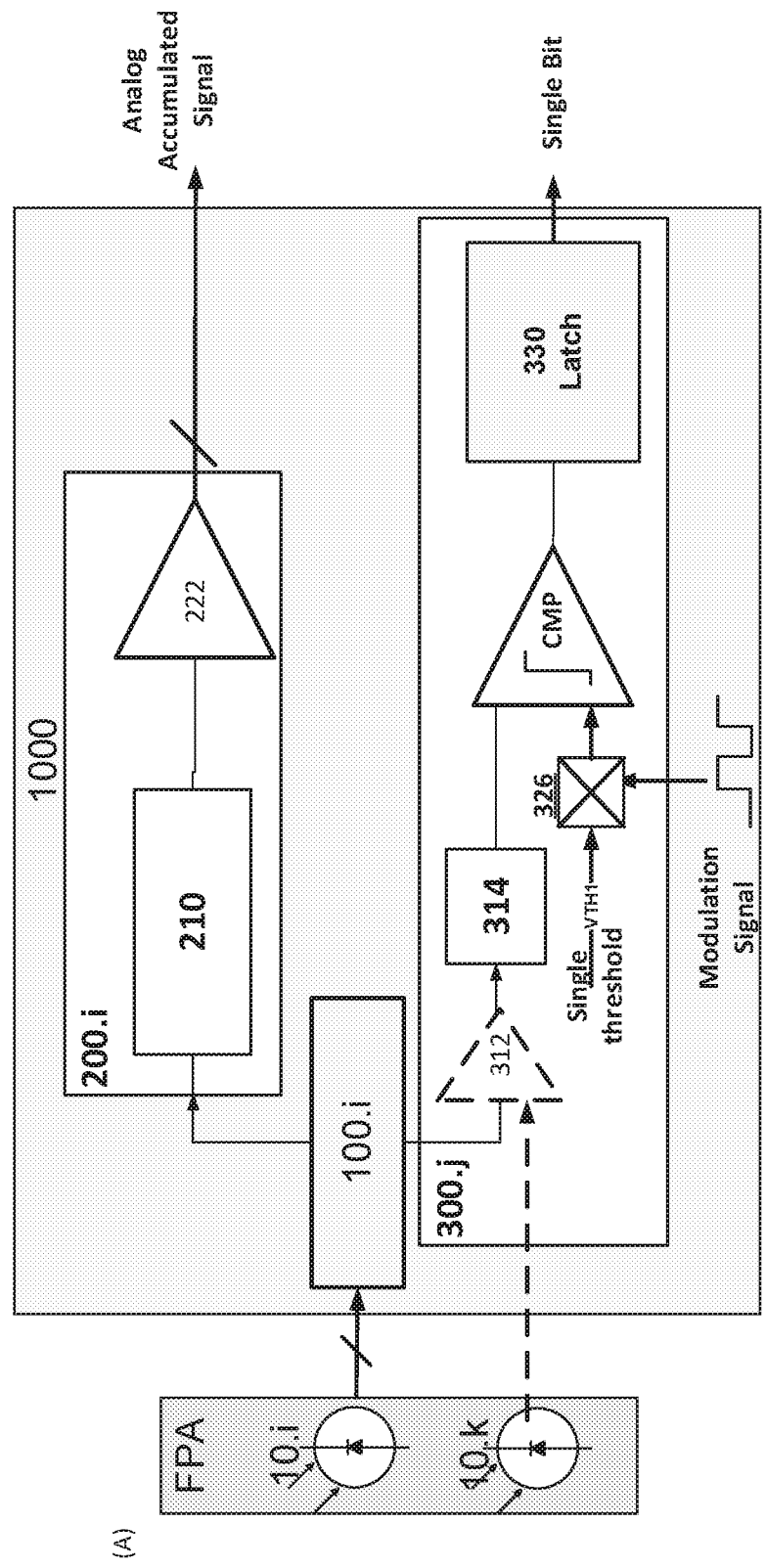
Figure 3D:
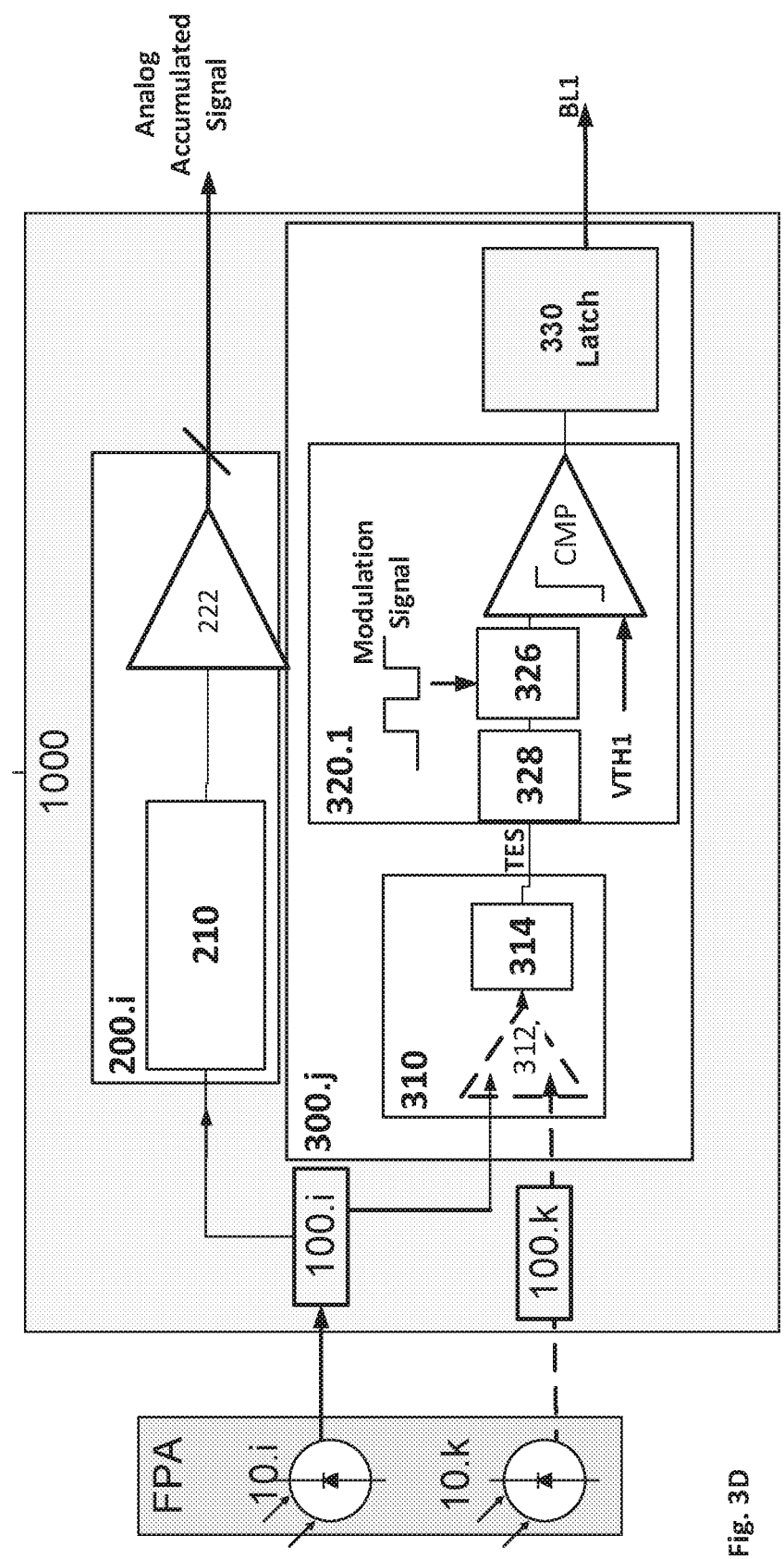
Figure 3E:
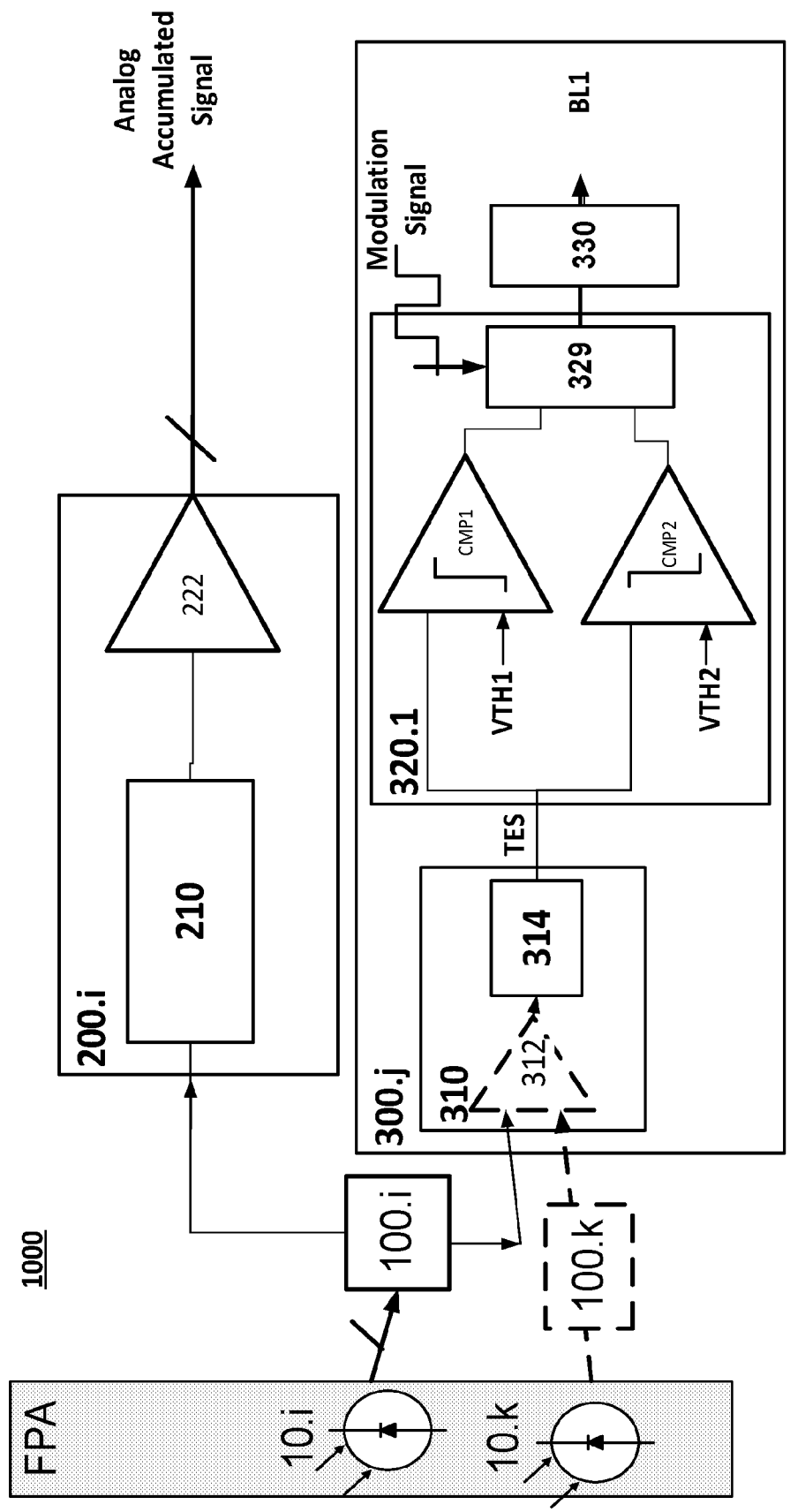

FIGS. 3C to 3E, exemplify three embodiments of the readout circuit 1000 of the present invention in which the pixel readout circuits PROICs are configured and operable for outputting the two bits indicative of the photocurrent derivative (indicating if the derivative is positive, negative, or zero), via only a single bit line. This thereby further substantially reduces. the number of bit lines of the readout circuit 1000 (e.g., reduces by about half as compared to FIG. 3B). In these embodiments the derivation circuits 300 each includes a single comparison channel 320.1 the single output bit line BL1 (and may optionally also include only a single memory bit (single latch) in the memory module 330). The single comparison channel 320.1 is configured and operable to carry out the comparison operations at about twice the second rate and serialize the digital data from the memory module 330 to the single bit line bit line at twice the second rate so that at each time slot of the second rate two bit are serialized through the single bit line BL1, indicative of the positive/negative/constant state of the derivative of the photocurrent. This is generally achieved by utilizing/multiplying a signal modulated at the second rate (the may be for example the second SYNC2 signal, a delayed duplicate thereof or different signal) for controlling the operation of the single comparison channel 320.1. The control of the single comparison channel 320.1 may be such that (or vice versa): at the first half time slot of the second rate (e.g., during which the modulated signal is positive) the comparison channel effectively compares an AC part of the total electric signal TES (of the total photocurrent of the cluster of pixels) with a positive threshold—thus yielding a single bit data indicative of the whether the derivative of the total signal is positive (e.g., in case it is above the positive threshold); and at the second half time slot of the second rate (e.g., during which the modulated signal is negative) the comparison channel effectively compares an AC part of the total electric signal TES with a negative threshold—thus yielding a single bit data indicative of the whether the derivative of the total signal is negative (e.g., in case it is below the negative threshold). Accordingly, the two bits may be outputted sequentially through the signal bit line and within the single time slot (period) of the second rate. Indeed, in case the two bits indicate that derivative of the total signal is not positive and not negative, (e.g., both bits are zero) the derivative of the total signal may be considered zero. Also in case in case the two bits indicate that derivative of the total signal is both positive and negative (e.g., both bits are one, which result may be caused by fast signal of substantial intensity fluctuating at higher than the second rate), than such result may be considered erroneous and may be associated poor signal to noise ratio.

To this end, by utilizing such modulated signal to control the operation of the comparison channel, the digital data DDval, which is more than one bit per period of one over the second rate (as it is indicative of whether a change in said total electric signal is above a predetermined upper threshold, below a predetermined lower threshold, or in between said predetermined upper and lower thresholds) is serialized at a rate higher than the second rate (e.g., twice the second rate) through the single bit line to thereby enable repeatedly completely readout of the digitized data at the second rate.

Reference is now made to FIGS. 3C and 3D in which the single comparison channel 320.1 including a single comparator CMP configured for receiving as inputs, and comparing, the total electric signal TES from the preprocessing channel 310 (e.g., from the filter 314), and the reference signal/voltage (e.g., being a single reference signal VTH1) from the reference channel VTH. In this example the single comparison channel 320.1 includes a signal modulator 326 connectable at one of the inputs of the comparator CMP and adapted to modulate at least one of the reference signal VTH1 or the total electric signal TES from the preprocessing channel 310 with modulation frequency matching the second rate. To this end, the signal modulator 326 may be configured as a mixer that mixes the signal which is to be modulated (e.g., TES or VTH1) with a modulated signal at the second frequency such as SYNC2 signal illustrated in FIGS. 1A to 1D. The comparator CMP in this example, operates at twice the second rate, such that the comparator effectively successively compares the total signal TES with the upper and lower thresholds (being in this case one the negative of the other), The results of such successive comparisons, which are indicative of the digital data DDval, are successively stored by the single memory bit (e.g., latch) of the memory module 330 of the single comparison channel. Accordingly when the single memory bit is read in to the single bit line BL1 at twice the second rate, the digitalized data DDval is serialized via the single bit line.

In the specific illustration of FIG. 3C, it is shown that the signal modulator 326 is connectable to the reference voltage channel/port of the comparator, thereby modulating the reference signal VTH1 fed therein to swing between the upper and lower thresholds at the second rate. The modulation signal is coupled as an alternating square input that is synchronized to the comparator. The modulation is added as part of the front-end circuit in such a way that the comparator is expected to detect a positive variation when the AC signal is constant and the modulation is positive. Similarly on the modulation step a negative variation indicates that the AC signal is constant. A variation of the AC signal that is opposed to the modulation will cause an inversion on the comparator output, in this way, the sign of the AC signal is detected alternatively.

Alternative ways to achieve somewhat similar results are exemplified in FIGS. 3D and 3E. In FIG. 3D a chopping circuit that alternatively inverts the sign of the AC signal is used instead of the modulation at the front-end circuit. In FIG. 3E, two comparators are used, one to detect a positive sign of the AC signal and one to detect a negative sign. The modulation is done digitally at the output of the comparator by combinatory logics.

To this end, as will be appreciated by those versed in the art and as specifically illustrated in FIG. 3D, the signal modulator 326 may be connectable to modulated the total electric signal TES before it is fed to the comprador CMP. Such connection may be performed via a signal chopper 328 that chopper the total electric signal TES at twice the second rate, for alternately inverting the total electric signal TES being chopped before it is fed to the comparator.

In the another alternative embodiment as illustrated in FIG. 2E the single comparison channel 320.1 includes two comparators CMP1 and CMP2 operable at the second rate. A first input of each of the two comparators is connectable to the preprocessing channel 310 providing the total electric signal TES and the second inputs of the two comparators are connectable to respective reference signals (e.g., references voltage channels), VTH1 and VTH2 voltage, providing signals/voltages corresponding to the upper and lower thresholds respectively. The single comparison channel further includes combinatory logic circuitry 329 inter-connected between outputs of said two comparators, CMP1 and CMP2 and the single bit memory/latch 330. The combinatory logic circuitry 329 is configured and operable for successively storing the outputs of the two comparators CMP1 and CMP2 and single bit memory/latch 330 thereby enabling to serialize the digitalized data DDval for read out via the single bit line BL1. The combinatory logic circuitry 329 may for example include a selectively operable switches connectable between the outputs of the comparators CMP1 and CMP2 and the input of the single bit memory/latch 330, and operable, e.g., in response to the modulated signal (e.g., SYNC2 signal) for interchangeable switching the connection of the memory input in between the outputs of the two comparators at twice the second rate.

In all cases exemplified in FIGS. 3C to 3E, after modulation, two consecutive positive will define a positive variation and two negative will define a negative variation. An alternating positive-negative signal will indicate that no variation is present.

Figure 4:
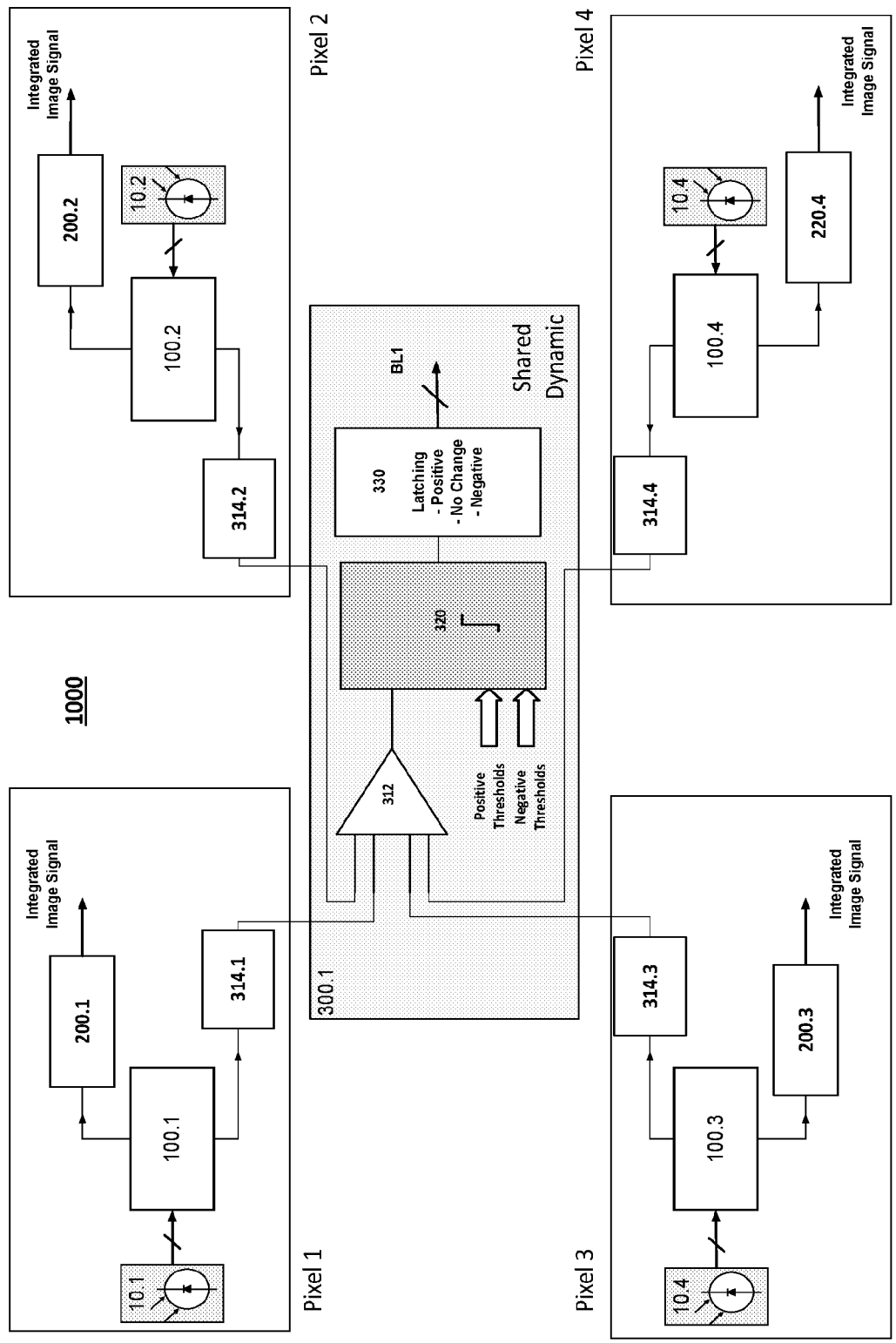
FIG. 4 is a block diagram illustrating in self-explanatory manner the configuration and operation of a readout circuit 1000 according to some embodiments of the present invention including pixel integration circuit per each pixel of the pixel matrix and pixel derivation circuit per each cluster of plurality of pixels such as four pixels.

Further optimization can be done by combining several AC signals into a shared dynamic processing block. Many sharing combinations are possible. A particular efficient solution for pixel geometry is sharing four pixels as shown in FIG. 4. As shown, 4 pixels are separately integrated while the AC signal is shared by comparators and latches.

To this end, and as also illustrated optionally, in the above figures, in some embodiments the readout circuit 1000 includes a pixel derivation circuit 300.j and a pixel integration circuit 200.i per each pixel 10.i of the pixel matrix 1. Alternatively, as for example illustrated in self-explanatory manner in FIG. 4, The readout circuit 1000 includes a pixel integration circuit 200.i per each pixel 10.i, and pixel derivation circuit 300.j per each cluster of few pixels (e.g., in this figure cluster of four pixels). The pixel derivation and integration circuits 300 and 200, may be connectable/connected to the front end circuits 100 of the respective pixels, and the pixel derivation circuits may each include an electric signal combiner 312 for combining the electric signals of the few pixels of the respective cluster as obtained from the front end circuits 100.

It should be noted that the modulation used to reduce the number of output bit lines in FIGS. 3C to 3E is also compatible with derivative circuits' 300 pixel sharing as depicted in FIG. 4. Here as shown 4 light sensitive pixels 10.1 to 10.4 are each connected, via respective front end (one of the circuits 100.1 to 100.4) to its respective integration circuit being one of the circuits 200.1 to 200.4. The pixels 10.1 to 10.4 are connected in/as a cluster to the common derivation 300.1.

Figure 5A:
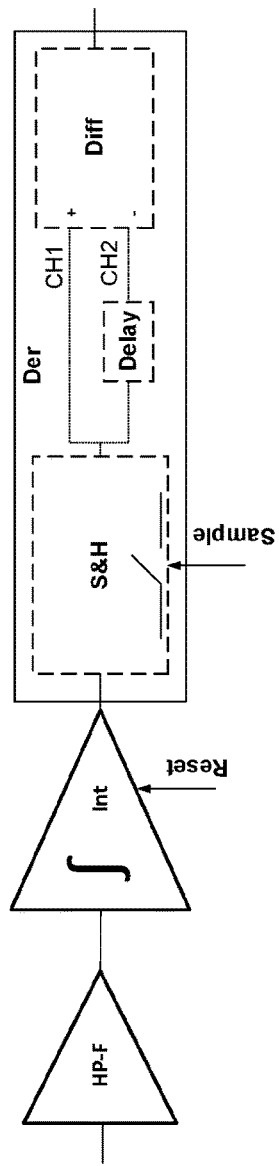
FIGS. 5A and 5B are a block diagram and a graphical illustration, respectively showing the configuration and operation of a filtration circuit 314 which is used in the pixel readout circuits of the present invention according to some embodiments of the present invention.
Figure 5B:
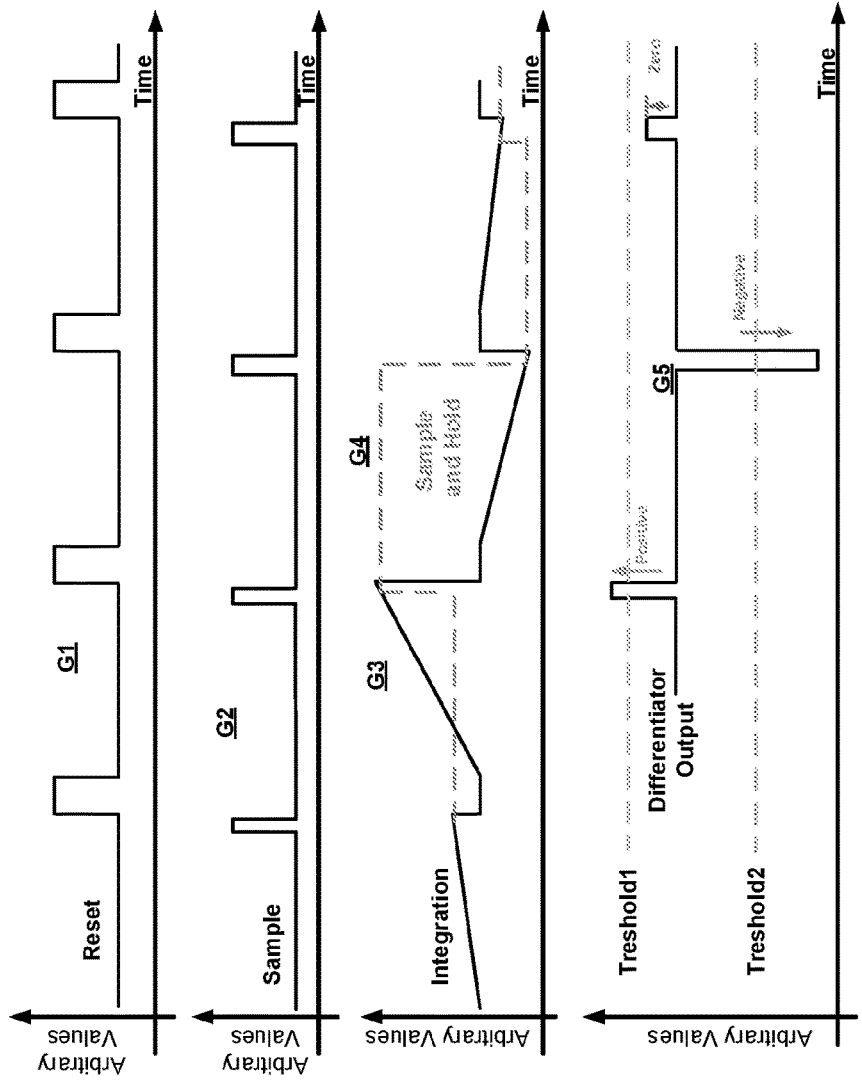

Reference is now made together to FIGS. 5A and 5B. FIG. 5A is a block diagram of the configuration of the filter 314 which may be used in the pixel readout circuits according to any one of the above embodiments of the present invention. FIG. 5B is a graphical illustration exemplifying the operation of this filter.

As indicated above the filtration circuit 314 used in the readout circuit 1000 of the present invention may generally be implemented utilizing any suitable high pass filter technology/configuration which is capable of filtering out low frequency components of the signals (generally considered as DC components) and thus obtaining/outputting the AC component of the signal. Such filters as generally know may be implemented for example using a suitable capacitor connected in series, or as a bandpass filter (BPS) such as Semi-Gaussian shaper.

In general, the filtration circuit 314 described with reference to the figures above is configured and operable for filtering out the low frequency components of the signal whose frequencies are somewhat below the second rate (being 1 over the time period of a time slot per each of which derivative data is outputted). To this end, in case the filtration circuit 314 comprises a conventional high path filter such as described above (e.g., capacitor connected in series or a bandpass filter (BPS) such as Semi-Gaussian shaper) such filter is configured for removing the frequencies somewhat below the second rate, and thus outputting frequencies in the order of and/or higher than the second rate.

In some embodiments of the present invention, it is advantageous to utilize a filtration circuit with a configuration such as that shown in FIG. 5A. In this embodiment, the filtration circuit includes:

a high path filter HP-F for receiving and filtering out low frequency components (e.g., DC components) of the electric signals associated with the total photocurrent(s) of the pixel, or cluster of the pixels, to which it is connected; In the present example although the filtration circuit 314 is configured to filter out the low frequency components of the signal whose frequencies are somewhat below the second rate, the high path filter HP-F itself may be adapted to filter out only low frequency components of much lower rates (e.g., those in the order of the frame rate (first rate). This is because filtration of AC components of higher rates is performed inherently by the integration Int and derivation Der circuits of the filtration circuit 314 which are described below. Accordingly a simpler high-pass filter HP-F may be used as compared with embodiments where the filtration circuit is implemented without the integration and derivation circuits discussed herein below.

an integrator circuit Int connected for receiving the filtered signal from the high path filter HP-F and configured and operable for integrating the filtered signal over time periods of the time slots per each of which derivative data is outputted by the readout circuit. In other words the integrator Int is configured for performing, per each time slot period, an integration of the filtered signal from the high path filter HP-F, and thereafter, the integrator Int is reset (i.e., after the integrated signal of the time slot period has being read out from the integrator Int). To this end, the integrator is sampled and then reset at a rate matching the second rate indicated above or at higher rate. The integrator circuit Int may be configured according to any suitable/known-in-the-art circuitry for instance by utilizing an integration capacitor or a Capacitive Trans-Impedance Amplifier (CTIA) or a switched capacitor integrator; and a derivation circuit Der, configured and operable for processing the integrated signal obtained from the integrator circuit Int to determine the derivative of the integrated signal per at least each time slot (i.e., the derivative of the integrated signal is determined with a rate that matches the second rate or higher). The integrator circuit Int may be configured according to any suitable/known-in-the-art circuitry for instance by utilizing a differentiator amplifier or a switched capacitor amplifier. In this particular non limiting example the derivation circuit includes: (i) a sample and hold circuit S&H that is configured and operable for sampling the integrated signal from the integrator Int at least the second rate and storing the value of the sampled integrated signal (e.g., the sample and hold circuit may for example include a switched capacitor circuit, a bootstrapped switch or a bottom-plate sampler); (ii) two signal channels CH1 and CH2 configured for receiving the signal from the sample and hold S&H circuit at least at the second rate, wherein one signal channel CH1 may be a direct channel with no delay, and the other signal channel CH2 includes a delay, Delay, (e.g., a memory/register) capable of storing the signal of the sample and hold S&H for predetermined time delay of duration matching the integration period of the integrator Int (i.e., the integration period being the duration between consecutive resets of the integrator Int, being performed at the second rate or higher rate as clarified above); and a differentiator circuit Diff connected to the to signal channels, CH1 and CH2, e.g., the time delayed and none time delayed, channels and configured and operable for determining the differences between the signals of this channels thereby determining the derivative of the signal integrated by the integrator Int. The differentiator circuit Diff may be configured according to any suitable/known-in-the-art circuitry for instance by utilizing a differential amplifier, a differentiator amplifier or a switched capacitor amplifier integrating the sample and hold S&H and the differentiator Diff in a single circuit.

To this end, the filtration circuit 314, in the embodiment of FIGS. 5A and 5B described above, utilizes a high path filter HP-F, having possible a relatively low frequency threshold of filtration, as well as integration and derivation circuits, Int and Diff, which consecutively integrate and derivate the signal in at least the second rate. The results of these consecutive integration and derivation circuits, is that the signal which is being integrated and then derivated at the second rate, is from the one hand filtered to remove low frequency components of rates lower than the second rate while advantageously, high frequency noise, with rates higher than the second rate is also filtered out as it is averaged out by the integration circuit. Consequently, in embodiments of the readout circuit, in which the configuration filtration circuit 314 according to the present example, the filtered signal which is fed to the comparison units 320 higher signal to noise ratio and thus the comparison units 320 outputs a digitized derivative data of improved accuracy.

Advantageously, the configuration of the filtration circuit 314, of the embodiments of FIG. 5A may be efficiently incorporated in to the readout circuit 1000 of the present invention (e.g., as discussed above and exemplified with reference to the embodiments of FIGS. 1A to 4). Indeed in some embodiments the filtration circuit 314 may be incorporated in the readout circuit 1000 such that it is connected to and exploits the same already existing SYNC2 and RST signals of the derivation circuit 300.j (see e.g., in FIG. 1D), in order to timely sampling and reset of the integrator circuit Int of the filtration circuit 314. In this connection, the SYNC2 signal may be connected to, or be the same as, the signal marked Sample in FIG. 5A), which operates the Sample and Hold circuit S&H. The RST signals of the derivation circuit 300.j may be connected to, or be the same as, the signal marked Reset in FIG. 5A), which resets the integration circuit Int, once sampled.

FIG. 5B is a self-explanatory graphical illustration of the operation of the filtration circuit 314 according to this embodiment of the present intention. The x axes is similar in all the graphs showing the time coordinate in arbitrary scale, and the y axes is provided in arbitrary values to illustrated the value of the respective signals shown in these graphs as function of time. The graphs G1 and G2 exemplify the reset and sample signals, Reset and Sample, by which the integrator is sampled and reset. Graphs G3 and G4, show the value of the integrator, which generally increases between resets, and the value of the sample and hold S&H, which stores the sampled value of the integrator prior to its last reset. Graph G5 exemplifies the output of the differentiator Diff, which generally corresponds to the derivative of the high frequency signal being measured. Also illustrated are two thresholds, Threshold1 and Threshold2 against which the derivative of the high frequency signal as output by the differentiator Diff is compared by the comparison unit 320 of the readout circuit 1000 as shown in the embodiments of FIGS. 1A-1D, 2A, and 3A-3E. In connection with graph G5, the positive, negative and zero output values from the comparison unit are indicated, in correspondence to the output of the differentiator Diff being: above Threshold1, below Threshold2, or between those thresholds, respectively. It would be appreciated that some embodiments of the invention may not implement such comparison against two or more thresholds, see e.g., FIG. 6 described below.

The embodiment of filtration circuit 314 described above with reference to FIGS. 5A and 5B thus provides an efficient technique for high path filtering of high frequency signals with reduced noise, which can be efficiently incorporated in the readout circuit of the present invention.

Figure 6:
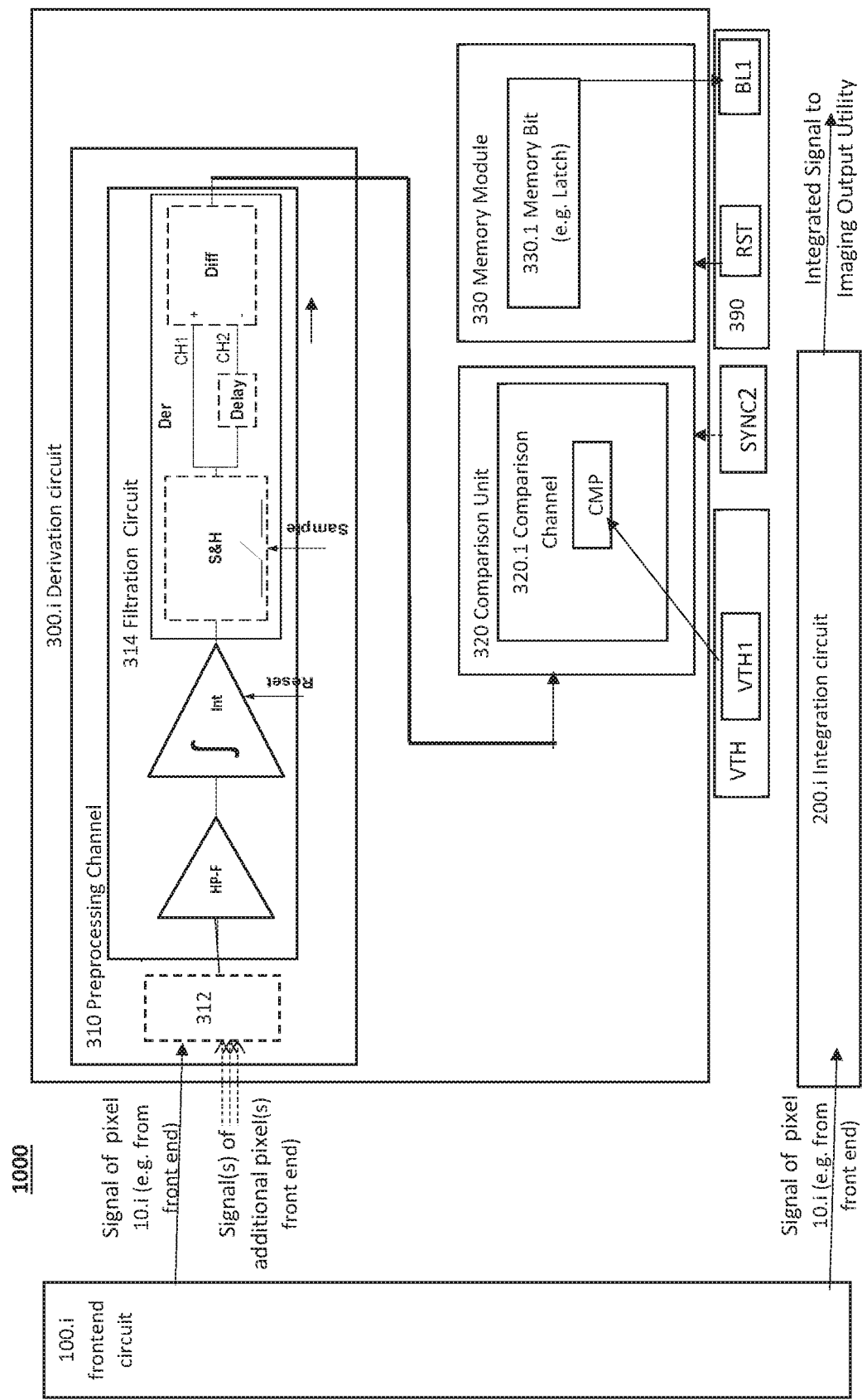
FIG. 6 is a block diagram of a readout circuit 1000 according to another embodiment of the present invention.

Reference is now made to FIG. 6 which shows a readout circuit 1000 for use with a pixel matrix according to another embodiment of the present invention. Like reference numerals, as in the figures described above, are used in this figure to designate components/utilities of the readout circuit of this embodiment, which are similar in configuration or have the similar function as the corresponding components of other embodiments of the present invention. Accordingly the description of the configuration or operation of the similar components above is effective for the present embodiment as well. The readout circuit includes:

(a) a pixel integration circuit 200.j, or an array thereof, whereby each pixel integration circuit 200.j is adapted for receiving an electric signal indicative of photocurrent of respective light sensitive pixel of the pixel matrix and is configured and operable for integrating said electric signal over a frame period to produce an integrated analogue signal. The pixel integration circuit(s) 200.j may be configured and operable according to any of the techniques described above, for instance as described above with reference to FIG. 1C; and (b) A pixel derivation circuit 300.j, or an array thereof. In this example each pixel derivation circuit includes:
  i) a signal preprocessing channel 310 comprising a filtration circuit 314. In this embodiment the filtration circuit is configured and operable similarly to the filtration circuit 314 described with reference to FIGS. 5A and 5B above. Namely the filtration circuit is configured and operable for receiving a total electric signal indicative of at least a component of the photocurrent(s) of a cluster of one or more respective light sensitive pixels of the pixel matrix and filtering out a DC component of the total electric signal to obtain a filtered total electric signal representing an AC component indicative of a variation in the photocurrents of the one or more light sensitive pixels of the cluster associated with the pixel derivation circuit; Advantageously the filtration circuit configured in this way provides a filtered high frequency component of the total electric signal from the pixels which has improved signal to noise; and
  ii) a comparison unit adapted to analyze said filtered total electric signal to determine digital data indicative of whether a change in said filtered total electric signal exceeds a predetermined threshold; In this particular example the comparison unit is not necessarily configured and operable for performing comparison against two thresholds (e.g., only one), As in the above, also here the array of pixel derivation circuits may be associated with a digital output utility adapted to enable readout of said digitized data at a second rate different than said frame rate; and the array of pixel integration circuits may be associated with an analog output.

The circuit of this embodiment is characterized in that the filtration circuit 314 includes: a high path filter H-PF for filtering out low frequency components of the total electric signal; and integration Int and a derivation Der circuit connected sequentially for receiving the filtered signal from the high path filter and operable for carrying out consecutive integration and derivation of the filtered signal. The above configuration of the filtration circuit is similar to that of FIG. 5A and the description of this figure above is relevant for the readout circuit of this embodiment as well. To this end, the filtration circuit thereby remove low frequency components as well as averaging out high frequency noise.

In some embodiments the digital output utility is adapted to enable readout of said digitized data at a second rate being one or more orders of magnitude higher than said frame rate and the filtration circuit is configured and operable for filtering out DC components of the total electric signal having frequencies are lower than said second rate. The consecutive integration and derivation may be performed at a rate matching said second rate or higher. In some implementations the high pass filter H-PF of the filtration circuit 314 is configured and operable for filtering out DC components of the total electric signal which have frequencies an order of magnitude or more lower than the second rate at which the digitized data is read. Further filtration of frequencies lower than said second rate is obtained via said consecutive integration and derivation of the filtered signal.

It should be noted that readout circuit 1000 of any one of the above embodiments may be configured and operable for connecting to a focal plane array (FPA) pixel matrix 1 that is configured and operable for sensing light in one or more spectral bands of the infra-red (IR) spectral regime.

It should be noted that readout circuit 1000 of any one of the above embodiments may be may be integrated with the pixel matrix 1, thereby providing an integrated photodetector array according to the present invention, which includes the matrix 1 of light sensitive pixels 10 and the readout circuit 100. For instance the integrated image sensor may be configured as a hybrid integrated heterostructure. In other words the readout circuit 1000 and the pixel matrix 1 may be configured/fabricated using different semiconductor technologies (e.g., different materials/compositions). For example the readout circuit 1 may be fabricated with, or include, silicon based semiconductor materials, and the pixel matrix may include, but is not limited to, any one or more of the following semiconductor technologies: InGaAs, Type II supper lattice, xBN, InSb, HgCdTe, Ge, and SiC.

The invention claimed is:

1. A readout circuit for use with a pixel matrix comprising an array of light sensitive pixels, the readout circuit comprising:
  (a) An array of pixel integration circuits, each pixel integration circuit is adapted for receiving an electric signal indicative of photocurrent of respective light sensitive pixel of the pixel matrix and is configured and operable for integrating said electric signal over a frame period to produce an integrated analogue signal; said array of pixel integration circuits is associated with an imaging output readout utility enabling readout of said integrated analogue signal, indicative of the light intensity sensed by said light sensitive pixel during said frame period, at an imaging frame rate being one over said frame period; and
  (b) An array of pixel derivation circuits; each pixel derivation circuit comprises signal preprocessing channel configured and operable for receiving a total electric signal indicative of at least a component of the photocurrent(s) of a cluster of one or more respective light sensitive pixels of the pixel matrix; a comparison unit adapted to analyze said total signal to determine digital data indicative of whether a change in said total electric signal is above a predetermined upper threshold, below a predetermined lower threshold, or in between said predetermined upper and lower thresholds; said array of pixel derivation circuits is associated with a digital output utility adapted to enable readout of said digitized data at a second rate different than said frame rate.

2. The readout circuit of claim 1, comprising an array of front-end input circuits associated with the light sensitive pixels of the pixel matrix, and wherein at least one of the following:
  (i) said pixel integration circuits are electrically connected to the front-end input circuits of the light sensitive pixels associated therewith respectively, for obtaining therefrom respective electric signals indicative of photocurrents of the respective light sensitive pixels; and
  (ii) said pixel derivation circuits are electrically connected to the front-end input circuits of the respective clusters of light sensitive pixels associated therewith respectively, for obtaining therefrom respective total electric signals indicative of the photocurrents of the one or more light sensitive pixels of the respective cluster.

3. The readout circuit of claim 1 wherein each pixel integration circuit comprises a capacitive unit comprising at least one capacitor, connectable to said input channel for accumulating a charge corresponding to received intensity generated by the respective light sensitive pixel of the pixel matrix during said frame period; and wherein said second rate is higher than said frame rate.

4. The readout circuit of claim 1, wherein said preprocessing channel of the pixel derivation circuit comprises a filtration circuit adapted for filtering a DC component of the total electric signal such that the total electric signal represents an AC component indicative of a variation in the photocurrents of the one or more light sensitive pixels of the cluster associated with the pixel derivation circuit.

5. The readout circuit of claim 4 wherein said digital output utility is adapted to enable readout of said digitized data at a second rate being one or more orders of magnitude higher than said frame rate; and wherein said filtration circuit is configured and operable for filtering out DC components of the total electric signal whose frequencies are lower than said second rate.

6. The readout circuit of claim 4 wherein said filtration circuit comprises: a high path filter for filtering out low frequency components of the total electric signal; and integration and a derivation circuit connected sequentially for receiving the filtered signal from the high path filter and operable for carrying out consecutive integration and derivation of the filtered signal; thereby removing low frequency components as well as averaging out high frequency noise.

7. The readout circuit of claim 1, wherein said comparison unit comprises one or more comparison channels each associated with digital output circuit of said digital readout utility and comprising a single output bit line; the one or more comparison channels are adapted for comparing said total electric signal with said predetermined upper and lower thresholds and thereby determining said digitized data.

8. The readout circuit of claim 7, wherein said comparison unit comprises a single comparison channel associated with a single latch and a single output bit line connectable to said single latch; and wherein the single comparison channel is further configured and operable to serialize said digital data for output through said single bit line.

9. The readout circuit of claim 8, wherein a rate of said digital data, which is being indicative of whether a change in said total electric signal is above a predetermined upper threshold, below a predetermined lower threshold, or in between said predetermined upper and lower thresholds, is greater than one bit per period of one over said second rate; and wherein said single comparison channel is capable of performing said serializing at a rate higher than said second rate to thereby enable repeatedly readout of said digitized data completely at a second rate.

10. The readout circuit of claim 8 wherein said single comparison channel comprises: two comparators operable at said second rate, wherein a first input of each of the two comparators is connectable to said preprocessing channel and the second inputs of the two comparators are connectable to respective reference voltage channels providing voltages of said upper and lower thresholds respectively; said single comparison channel further comprises combinatory logic circuitry inter-connected between outputs of said two comparators and the single latch and operable for successively storing the outputs of said two comparators by said single latch thereby enabling to serialize said digitalized data for read out via the single bit line.

11. The readout circuit of claim 7 comprising two comparison channels associated with two bit-lines and wherein a reference voltage of a comparator of a first one of said comparison channels provides said upper threshold, and a reference voltage of a comparator of a second one of said comparison channels provides said lower threshold; thereby enabling to readout said digital data via said two bit lines at said second rate.

12. The readout circuit of claim 1, wherein at least one of the following:
at least one pixel derivation circuit of the pixel derivation circuits is configured and operable for electrically, directly or indirectly, connecting to a single respective light sensitive pixel of the pixel matrix, and said total electric signal indicative of at least a component of the photocurrent of the single respective light sensitive pixel; and
at least one pixel derivation circuit of the pixel derivation circuits is configured and operable for, directly or indirectly, electrically connecting to a plurality of light sensitive pixels of the cluster associated with therewith; and wherein the signal preprocessing channel of the at least one pixel derivation circuit is configured and operable for combining at least components of the electric signals, which are indicative of the photocurrents of said plurality of light sensitive pixels, of said cluster to thereby from said total electric signal.

13. An integrated image sensor, comprising a readout circuit according to claim 1 electrically coupled to a light sensitive pixel matrix operable for imaging light in one or more spectral bands.

14. The integrated image sensor of claim 13, wherein at least one of the following:
the readout circuit and the light sensitive pixel matrix are integrated;
the readout circuit and the light sensitive pixel matrix are configured as a hybrid integrated heterostructure and wherein said readout circuit and said pixel matrix are made of different semiconductor technologies;
said readout circuit comprises silicon based semiconductor materials and said pixel matrix comprises any one or more of the following semiconductor technologies: InGaAs, Type II supper lattice, xBN, InSb, HgCdTe, Ge, SiC;
the readout circuit is configured and operable for connecting to said pixel matrix whereby said pixel matrix is a focal plane array (FPA).

15. An imaging processing system adapted for connecting to the imaging output readout utility and to the digital output utility of the readout circuit according to claim 1, and configured and operable for carrying out the following to obtain video information at a video frame rate higher than said imaging frame rate:
Obtain, from said imaging output readout utility of the readout circuit, imaging data comprising the integrated analogue signals indicative of the light intensity sensed by each light sensitive pixel of said pixel matrix during each frame period, thereby yielding a video data comprising image frames at said imaging frame rate;
Obtain said digitized data from the digital output readout utility at said second rate;
Process the digitized data at said second rate to determine whether the change in the total electric signal of at least one cluster of one or more respective light sensitive pixels of the pixel matrix, is above the predetermined upper threshold or below the predetermined lower threshold; wherein such change indicates that the intensity sensed by one or more light sensitive pixels of the cluster is rapidly changing, upwards or downwards respectively, with rate higher than said imaging frame rate; and Upon determining such change updating the values of corresponding pixels in the video data thereby obtaining an updated video data with video frame rate matching said second rate.

16. A method for processing, by a readout circuit, electric signals obtained from light sensitive pixels of a pixel matrix, comprising:

operating an array of pixel integration circuits of the readout circuit, each pixel integration circuit being adapted for receiving an electric signal indicative of photocurrent of respective light sensitive pixel of the pixel matrix, for: integrating electric signals indicative of the light intensity sensed by each light sensitive pixel of a pixel matrix over each frame period of a first rate, being imaging frame rate, to produce integrated analogue signals; and outputting said integrated analogue signals via an imaging output readout utility of the readout circuit thereby enabling readout of said integrated analogue signals, yielding integrated image data indicative of a video comprising image frames at said imaging frame rate;

operating an array of pixel derivation circuits, each pixel derivation circuit comprises a signal preprocessing channel, for receiving and filtering total electric signal, indicative of the sum of at least a component of the photocurrent(s) of light intensity sensed by a cluster of one or more light sensitive pixel of the pixel matrix, to obtain filtered electric signals indicative of changes in light intensity sensed by respective clusters of one or more light sensitive pixel of the pixel matrix in each cluster; and operating comparison units associated with the pixel derivation circuits respectively, for comparing the filtered electric signals with a plurality of at least two thresholds including a predetermined upper threshold and a predetermined lower threshold, at a second rate different than said imaging frame rate, to determine at said second rate, digitized data indicative of whether the changes in the total electric signals of the light intensities sensed by respective clusters of pixels is above the predetermined upper threshold, below the predetermined lower threshold, or in between said predetermined upper and lower thresholds, to enable output of said digitized data corresponding to positive, negative or zero derivative values of the light intensities sensed by respective clusters, via a digital output utility associated with said array of pixel derivation circuits.

17. The method of claim 16 comprising: analog output of an analogue representation of said integrated image data, at said imaging frame rate; and digital output of said digitized data via a single bit line per each cluster of said respective clusters, wherein said single bit line is operated at least 1.5 said second rate thereby enabling to completely output said digitized data at said second rate.

18. A readout circuit for use with a pixel matrix comprising an array of light sensitive pixels, the readout circuit comprising:

(a) An array of pixel integration circuits, each pixel integration circuit is adapted for receiving an electric signal indicative of photocurrent of respective light sensitive pixel of the pixel matrix and is configured and operable for integrating said electric signal over a frame period to produce an integrated analogue signal; said array of pixel integration circuits is associated with an imaging output readout utility enabling readout of said integrated analogue signal, indicative of the light intensity sensed by said light sensitive pixel during said frame period, at an imaging frame rate being one over said frame period; and (b) An array of pixel derivation circuits; each pixel derivation circuit comprises:

i) signal preprocessing channel comprising a filtration circuit configured and operable for receiving a total electric signal indicative of at least a component of the photocurrent(s) of a cluster of one or more respective light sensitive pixels of the pixel matrix and filtering out a DC component of the total electric signal to obtain a filtered total electric signal representing an AC component indicative of a variation in the photocurrents of the one or more light sensitive pixels of the cluster associated with the pixel derivation circuit; and ii) a comparison unit adapted to analyze said filtered total electric signal to determine digital data indicative of whether a change in said filtered total electric signal exceeds a predetermined threshold;

said array of pixel derivation circuits is associated with a digital output utility adapted to enable readout of said digitized data at a second rate different than said frame rate; and wherein said filtration circuit comprises: a high path filter for filtering out low frequency components of the total electric signal; and integration and a derivation circuit connected sequentially for receiving the filtered signal from the high path filter and operable for carrying out consecutive integration and derivation of the filtered signal; thereby remove low frequency components as well as averaging out high frequency noise.

* * * * *